US010355742B2

(12) United States Patent
Choi et al.

(10) Patent No.: US 10,355,742 B2
(45) Date of Patent: Jul. 16, 2019

(54) METHOD AND DEVICES FOR RAY-SCANNING IN WIRELESS ACCESS SYSTEM SUPPORTING MILLIMETER WAVES

(71) Applicant: LG ELECTRONICS INC., Seoul (KR)

(72) Inventors: Kukheon Choi, Seoul (KR); Jaehoon Chung, Seoul (KR); Genebeck Hahn, Seoul (KR); Eunjong Lee, Seoul (KR); Jinmin Kim, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/550,742

(22) PCT Filed: Feb. 13, 2015

(86) PCT No.: PCT/KR2015/001495
§ 371 (c)(1),
(2) Date: Aug. 11, 2017

(87) PCT Pub. No.: WO2016/129728
PCT Pub. Date: Aug. 18, 2016

(65) Prior Publication Data
US 2018/0034500 A1 Feb. 1, 2018

(51) Int. Cl.
*H04H 20/71* (2008.01)
*H04B 1/7087* (2011.01)
(Continued)

(52) U.S. Cl.
CPC ......... *H04B 1/7087* (2013.01); *H04B 1/7083* (2013.01); *H04B 7/04* (2013.01);
(Continued)

(58) Field of Classification Search
CPC ....... H04B 1/7087; H04B 1/7083; H04B 7/04
See application file for complete search history.

(56) References Cited

U.S. PATENT DOCUMENTS

2012/0320874 A1* 12/2012 Li ..................... H04W 48/12
370/331
2013/0229309 A1 9/2013 Thomas et al.
(Continued)

FOREIGN PATENT DOCUMENTS

KR 1020150015447 2/2015

OTHER PUBLICATIONS

PCT International Application No. PCT/KR2015/001495, Written Opinion of the International Searching Authority dated Nov. 19, 2015, 15 pages.

*Primary Examiner* — Md K Talukder
(74) *Attorney, Agent, or Firm* — Lee Hong Degerman Kang & Waimey

(57) ABSTRACT

The present invention relates to a signal transceiving method for detecting site-specific ray characteristics information unique to millimeter wave (mm Wave) links and detecting rich resolvable rays, and to device supporting same. The method for a terminal ray-scanning in a wireless access system supporting millimeter wave technology, according to one embodiment of the present invention, comprises the steps of: receiving a synchronization signal to synchronize with a base station; synchronizing with the base station using the synchronization signal; receiving, from the base station, pilot signals having different configuration patterns according to each transmitting antenna port; and ray-scanning using the pilot signals.

10 Claims, 16 Drawing Sheets

(51) Int. Cl.
*H04B 7/04* (2017.01)
*H04B 1/7083* (2011.01)
*H04W 52/02* (2009.01)
*H04W 56/00* (2009.01)
*H04B 7/06* (2006.01)
*H04B 7/08* (2006.01)
*H04B 1/7163* (2011.01)
*H04B 7/26* (2006.01)

(52) U.S. Cl.
CPC .......... *H04B 7/0695* (2013.01); *H04B 7/088* (2013.01); *H04W 52/0245* (2013.01); *H04W 56/0015* (2013.01); *H04B 1/7163* (2013.01); *H04B 7/2643* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/40* (2018.01); *Y02D 70/444* (2018.01); *Y02D 70/449* (2018.01)

(56) References Cited

U.S. PATENT DOCUMENTS

| | | |
|---|---|---|
| 2013/0286960 A1* | 10/2013 | Li .................... H04W 72/042 370/329 |
| 2013/0301563 A1 | 11/2013 | Gupta et al. |
| 2013/0315321 A1 | 11/2013 | Rajagopal et al. |
| 2013/0321207 A1* | 12/2013 | Monogioudis ......... H01Q 1/246 342/373 |
| 2014/0056381 A1 | 2/2014 | Wang |
| 2014/0302869 A1* | 10/2014 | Rosenbaum .......... H04W 4/026 455/456.1 |
| 2015/0208389 A1* | 7/2015 | Imamura .................. H04J 11/00 370/329 |
| 2015/0341096 A1* | 11/2015 | Gao ..................... H04B 7/0634 370/278 |
| 2017/0303141 A1* | 10/2017 | Islam ................... H04B 7/0408 |
| 2018/0034500 A1* | 2/2018 | Choi ....................... H04B 7/04 |

* cited by examiner

Tk

Time taken for UE having predetermined
bandwidth for one BS beam direction to
perform scanning in all directions $T_{tx\_scan}$ Transmit pilot with determined Rx beam
and determine Tx beam (a) 60GHz indoor AOA measurement[1]

(b) 60GHz corridor AoA measurement[1]

Tx/Rx distance : 77m (a)

(b)

(a) PAS change according to beam width[3]

(b) RMS DS change by directional antenna[4]

– – Omni(full power)
— Beamforming

| Port 1 | Sync signal | Full power transmission | empty | • • • | empty |

• Set longer than excess delay spread

| Port 2 | Sync signal | empty | Full power transmission | • • • | empty |

| Port N | Sync signal | empty | empty | • • • | Full power transmission |

METHOD AND DEVICES FOR RAY-SCANNING IN WIRELESS ACCESS SYSTEM SUPPORTING MILLIMETER WAVES

CROSS-REFERENCE TO RELATED APPLICATIONS

This application is the National Stage filing under 35 U.S.C. 371 of International Application No. PCT/KR2015/001495, filed on Feb. 13, 2015, the contents of which are hereby incorporated by reference herein in its entirety.

TECHNICAL FIELD

The present invention relates to a wireless access system, and more particularly, to a method of transceiving signals for detection of site specific ray property information unique to millimeter wave (mmWave) link and detection of abundant resolvable rays and apparatus for supporting the same.

BACKGROUND ART

Wireless access systems have been widely deployed to provide various types of communication services such as voice or data services. Generally, a wireless access system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

When an existing beamforming method applies to an mmWave system used on high frequency band, it may cause a problem that a considerably long time delay is generated from a beam searching and a problem that unique channel property of a radio channel cannot be obtained. Moreover, there is a problem that an existing ray scanning method is applicable to a system having a small cell size only.

DISCLOSURE OF THE INVENTION

Technical Task

The present invention is devised to solve the above problems, and one technical task of the present invention is to provide an efficient data transceiving method in an mmWave system.

Another technical task of the present invention is to provide a method of improving pilot or reference signal detection in a rapid path loss situation according to the mmWave property.

Further technical task of the present invention is to provide a method of reducing complexity in beam scanning and improving cell coverage by selecting a directional beam candidate on ray scanning in an mmWave system.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention provides a signal transceiving method for detection of site specific ray property information unique to mmWave link and detection of abundant resolvable ray and apparatuses supporting the same.

In one technical aspect of the present invention, provided herein is a method of a ray scanning by a user equipment in a wireless access system supportive of a millimeter wave technology, including receiving a synchronization signal to match synchronization with a base station, matching the synchronization with the base station using the synchronization signal, receiving a pilot signal having a different configuration pattern per transmitting antenna port from the base station, and performing the ray scanning using the pilot signal.

The pilot signal is repeatedly transmitted a predetermined number of times.

The pilot signal may be transmitted from all transmitting antenna ports of the base station within an index duration and the pilot signal may be transmitted with a predetermined period.

The pilot signal may be transmitted through a single transmitting antenna port. While the pilot signal is transmitted from the single transmitting antenna port, the pilot signal may not be transmitted from the rest of the transmitting antenna ports of the base station.

The method may further include obtaining a temporary cell identifier of a cell supported by the base station using the synchronization signal and the user equipment may perform a cell-specific ray scanning using the temporary cell identifier.

In another technical aspect of the present invention, provided herein is a user equipment performing a ray scanning in a wireless access system supportive of a millimeter wave technology, including a receiving module and a processor configured to support the ray scanning.

In this case, the processor may be further configured to receive a synchronization signal to match synchronization with a base station through the receiving module, match the synchronization with the base station using the synchronization signal, receive a pilot signal having a different configuration pattern per transmitting antenna port from the base station, and perform the ray scanning using the pilot signal.

The pilot signal is repeatedly transmitted a predetermined number of times.

The pilot signal may be transmitted from all transmitting antenna ports of the base station within an index duration and the pilot signal may be transmitted with a prescribed period.

The pilot signal may be transmitted through a single transmitting antenna port. While the pilot signal is transmitted from the single transmitting antenna port, the pilot signal may not be transmitted from the rest of the transmitting antenna ports of the base station.

The processor may be further configured to obtain a temporary cell identifier of a cell supported by the base station using the synchronization signal and wherein the user equipment performs a cell-specific ray scanning using the temporary cell identifier.

The above aspects of the present invention are just parts of preferred embodiments of the present invention, and various embodiments reflecting the technical features of the present invention can be derived and understood from the following description by those having ordinary skill in the technical field to which the present invention pertains.

Advantageous Effects

According to embodiments of the present invention, the following effects are provided.

First of all, using the present invention, data can be efficiently transceived in in an mmWave system.

Secondly, using a pilot or reference signal proposed by the present invention, a rapid path loss problem due to the mmWave property can be solved.

Thirdly, by providing a method of using a directional antenna on performing a ray scanning in an mmWave system, cell coverage can be enhanced better than that of an existing ray scanning.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. And, the accompanying drawings are used to describe embodiments of the present invention together with the detailed description.

FIG. 14 is a diagram showing one of pilot signal configuring methods for transmitting a pilot signal for a ray scanning by each period M.

BEST MODE FOR INVENTION

Figure 1:
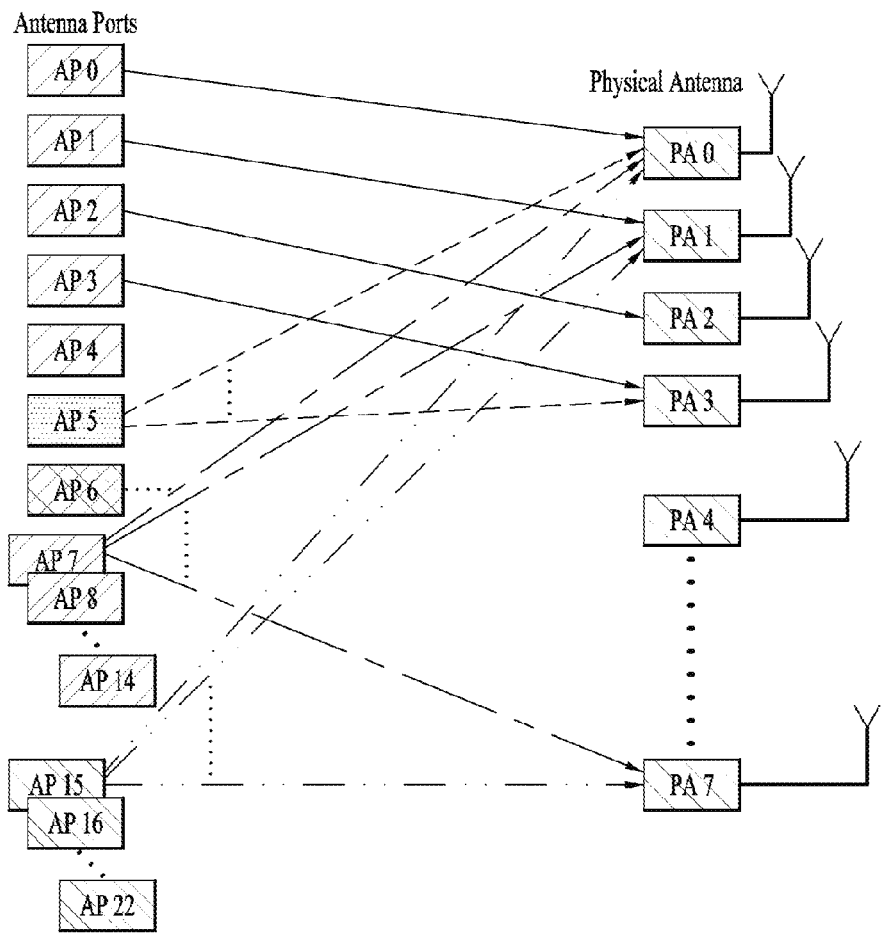
FIG. 1 is a diagram showing one example of an antenna port used in mmWave.

The following embodiments of the present invention described in detail provide a method of transceiving signals for detection of site specific ray property information unique to millimeter wave (mmWave) and detection of abundant resolvable rays.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the description of the drawings, procedures, steps and the like that may obscure the concept of the present invention are not described and procedures or steps on the level understandable by those skilled in the art are not described as well.

In the whole specification, if a prescribed part 'comprises or includes' a prescribed component, this means that other components can be further included instead of excluding them unless a presence of especially opposed description. A term such as '~part', '~unit', 'module' and the like means a unit for processing at least one function or operation, which can be implemented by hardware, software or combination of hardware and software. Moreover, 'a or an', 'one', 'the' and similar related terms can be used as the meaning of including the singular and the plural both unless differently indicated in the present specification or clearly refuted by context.

In this specification, embodiments of the present invention are described centering on the data transmission/reception relations between a base station and a mobile station. In this case, the base station may be meaningful as a terminal node of a network which directly performs communication with the mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other networks except the base station. Herein, 'base station (BS)' may be substituted with such a terminology as a fixed station, a Node B, an eNode B (eNB), an advanced base station (ABS), an access point (AP) or the like.

In the embodiments of the present invention, a terminal may be substituted with such a terminology as a user equipment (UE), a mobile station (MS), a subscriber station (SS), a mobile subscriber station (MSS), a mobile terminal, an advanced mobile station (AMS), or the like.

A transmitting end means a fixed and/or mobile node providing a data or voice service and a receiving end means a fixed and/or mobile node receiving a data or voice service. Hence, a mobile station and a base station may become a transmitting end and a receiving end in uplink, respectively. Likewise, a mobile station and a base station may become a receiving end and a transmitting end, respectively.

Embodiments of the present invention may be supported by the disclosed standard documents of at least one of wireless access systems including IEEE 802.xx system, 3GPP ($3^{rd}$ generation partnership project) system, 3GPP LTE system, and 3GPP2 system. Particularly, the embodiments of the present invention can be supported by documents of 3GPP TS 36.211, 3GPP TS 36.212, 3GPP TS 36.213, 3GPP TS 36.321 and 3GPP TS 36.331. In particular, the steps or parts, which are not explained to clearly reveal the technical idea of the present invention, in the embodiments of the present invention may be supported by the above documents. Moreover, all terminologies disclosed in this document may be supported by the above standard documents.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

Specific terminologies used for the following description may be provided to help the understanding of the present invention. And, the use of the specific terminology may be modified into other forms within the scope of the technical idea of the present invention.

For instance, a cellular system may mean an LTE or LTE-A system, and an mmWave system may mean a system supportive of mmWave in the LTE or LTE-A system. Namely, the mmWave system means a wireless access system supportive of mmWave property. Moreover, a term called 'ray' in the embodiments of the present invention may mean a unique signal generated from mmWave link or a cluster of unique signals in case of not performing beamforming.

3GPP LTE/LTE-A system as one example of a wireless access system usable for embodiments of the present invention is described as follows.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) system is an evolved version of 3GPP LTE system. To clarify the description of the technical features of the present invention, the description is made centering on 3GPP LTE/LTE-A system and may apply to IEEE 802.16e/m system and the like as well.

1. Millimeter Wave (mmWave)

The present invention relates to a signal transceiving method for detection of site specific ray property information unique to mmWave link and detection of abundant resolvable ray and apparatuses supporting the same. Due to an existing short mmWave cell range, it is essential to perform a beamforming for obtaining a transceiving antenna beam gain. Hence, a beamforming based beam scanning scheme has been proposed as an mmWave scanning scheme as well. Yet, such technologies have disadvantage that a transceiving scanning delay increases due to overhead according to a beam scanning.

A ray scanning scheme proposed by the present invention is effective in reducing a large overhead according to a beam scanning scheme by detecting a unique feature of an mmWave environment. Moreover, since information attributed to a transceived beam scanning of a user equipment is not unique property information (e.g., PDP (power delay profile, PAS (power azimuth spectrum, etc.) of channel, it can be used for acquisition and application of information unique to a channel.

1.1 Antenna Port

FIG. 1 is a diagram showing one example of an antenna port used in mmWave.

An antenna port is a virtual concept for a physical antenna. An output outputted through an antenna port should include a reference signal (RS). As an output outputted through a single antenna port includes an RS, it may be regarded as an antenna stream unit that can be received in a manner that a user equipment detects the RS and then estimates a channel.

Hence, no matter whether a single antenna stream is transmitted through two or more physical antennas or several physical antennas by spatial precoding (i.e., one of transmission beamforming), a user equipment can perform a reception by assuming a single antenna port.

Referring to FIG. 1, a physical antenna is configured by a separate mapping to an antenna port, and mapping between a physical antenna and an antenna port is determined according to a vender. Hence, it is unnecessary to consider an implementation problem of a physical antenna, but descriptions of a method of transmitting a signal or data per antenna port are taken into consideration.

1.2 Antenna Port Configuration of LTE System

The following Table 1 shows antenna ports used for physical channels and signals.

TABLE 1

| Physical channel or signal | | Antenna port number p as a function of the number of antenna ports configured for the respective physical channel/signal | | |
|---|---|---|---|---|
| | Index $\tilde{p}$ | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

1.2.1 Precoding

A precoder of a transmitting end takes a block vector $[y^{(0)}(i) \ldots y^{(v-1)}(i)]^T$, $i=0, 1, \ldots, M_{symb}^{layer}-1$ as an input from a transmitting precoder and generates a block vector $[z^{(0)}(i) \ldots z^{(P-1)}(i)]^T$, $i=0, 1, \ldots, M_{symb}^{ap}-1$ mapped to resource elements.

Regarding the precoding for transmission on a single antenna port, the precoding is defined as $z^{(0)}(i)=y^{(0)}(i)$. Herein, $i=0, 1, \ldots, M_{symb}^{ap}-1$ and $M_{symb}^{ap}=M_{symb}^{layer}$.

The precoding for spatial multiplexing is only used together with a layer mapping for spatial multiplexing. Spatial multiplexing supports antenna port P=2 or P=4, and antenna port sets used for spatial multiplexing includes $p \in \{20,21\}$ and $p \in \{40,41,42,43\}$, respectively.

Precoding for spatial multiplexing is defined as $$\begin{bmatrix} z^{(0)}(i) \\ \vdots \\ z^{(P-1)}(i) \end{bmatrix} = W \begin{bmatrix} y^{(0)}(i) \\ \vdots \\ y^{(v-1)}(i) \end{bmatrix}.$$

Herein, $i=0, 1, \ldots, M_{symb}^{ap}-1$ and $M_{symb}^{ap}=M_{symb}^{layer}$.

A precoding matrix W having a size P×υ for an antenna port P=2 is given by one of the entries shown in Table 2.

TABLE 2

| Codebook index | Number of layers | |
|---|---|---|
| | v = 1 | v = 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | — |
| 2 | $\frac{1}{\sqrt{2}}\begin{bmatrix} 1 \\ j \end{bmatrix}$ | — |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | — |
| 5 | $\frac{1}{\sqrt{2}}\begin{bmatrix} 0 \\ 1 \end{bmatrix}$ | — |

A precoding matrix W having a size P×υ for an antenna port P=4 is given by one of the entries shown in Table 3. In Table 3, each row is represented in order of increasing a codebook index from the left to the right. Table 3 shows a case that υ is 1. If υ is 2 to 4, Tables 5.3.3A.2-3 to 5.3.3A2-5 of TS36.211 v12.3 specifications are referred to.

TABLE 3

| Codebook index | Number of layers v = 1 |
|---|---|
| 0 – 7 | $\frac{1}{2}\begin{bmatrix} 1 \\ 1 \\ 1 \\ -1 \end{bmatrix}$ $\frac{1}{2}\begin{bmatrix} 1 \\ 1 \\ j \\ j \end{bmatrix}$ $\frac{1}{2}\begin{bmatrix} 1 \\ 1 \\ -1 \\ 1 \end{bmatrix}$ $\frac{1}{2}\begin{bmatrix} 1 \\ 1 \\ -j \\ -j \end{bmatrix}$ $\frac{1}{2}\begin{bmatrix} 1 \\ j \\ 1 \\ j \end{bmatrix}$ $\frac{1}{2}\begin{bmatrix} 1 \\ j \\ j \\ 1 \end{bmatrix}$ $\frac{1}{2}\begin{bmatrix} 1 \\ j \\ -1 \\ -j \end{bmatrix}$ $\frac{1}{2}\begin{bmatrix} 1 \\ j \\ -j \\ -1 \end{bmatrix}$ |
| 8 – 15 | $\frac{1}{2}\begin{bmatrix} 1 \\ -1 \\ 1 \\ 1 \end{bmatrix}$ $\frac{1}{2}\begin{bmatrix} 1 \\ -1 \\ j \\ -j \end{bmatrix}$ $\frac{1}{2}\begin{bmatrix} 1 \\ -1 \\ -1 \\ -1 \end{bmatrix}$ $\frac{1}{2}\begin{bmatrix} 1 \\ -1 \\ -j \\ j \end{bmatrix}$ $\frac{1}{2}\begin{bmatrix} 1 \\ -j \\ 1 \\ -j \end{bmatrix}$ $\frac{1}{2}\begin{bmatrix} 1 \\ -j \\ j \\ -1 \end{bmatrix}$ $\frac{1}{2}\begin{bmatrix} 1 \\ -j \\ -1 \\ j \end{bmatrix}$ $\frac{1}{2}\begin{bmatrix} 1 \\ -j \\ -j \\ 1 \end{bmatrix}$ |
| 16 – 23 | $\frac{1}{2}\begin{bmatrix} 1 \\ 0 \\ 1 \\ 0 \end{bmatrix}$ $\frac{1}{2}\begin{bmatrix} 1 \\ 0 \\ -1 \\ 0 \end{bmatrix}$ $\frac{1}{2}\begin{bmatrix} 1 \\ 0 \\ j \\ 0 \end{bmatrix}$ $\frac{1}{2}\begin{bmatrix} 1 \\ 0 \\ -j \\ 0 \end{bmatrix}$ $\frac{1}{2}\begin{bmatrix} 0 \\ 1 \\ 0 \\ 1 \end{bmatrix}$ $\frac{1}{2}\begin{bmatrix} 0 \\ 1 \\ 0 \\ -1 \end{bmatrix}$ $\frac{1}{2}\begin{bmatrix} 0 \\ 1 \\ 0 \\ j \end{bmatrix}$ $\frac{1}{2}\begin{bmatrix} 0 \\ 1 \\ 0 \\ -j \end{bmatrix}$ |

1.2.2 Mapping for Physical Resource

Regarding each antenna port p used for PUSCH (Physical Uplink Shared Channel) transmission in a subframe, a block $z^{(\tilde{p})}(0), \ldots, z^{(\tilde{p})}(M_{symb}^{ap}-1)$ of complex symbols should be multiplied by an amplitude scaling factor $\beta_{PUSCH}$ to secure a transmit power $P_{PUSCH}$, mapped to a sequence starting with $z^{(\tilde{p})}(0)$ for physical resource blocks for the antenna port p, and is assigned for PUSCH transmission. Relation between an index $\tilde{p}$ and an antenna port p is given by Table 1. Mapping for a resource element corresponding to a physical resource block for transmission starts from a first slot of a corresponding subframe and is mapped in increasing order of index 1 after index k.

Moreover, regarding mapping for a resource element (k,l) corresponding to a physical resource block; (1) it is not used for transmission of a reference source; (2) if a user equipment performs SRS transmission in a specific subframe, it is not mapped to a last SC-FDMA symbol of a corresponding subframe; (3) if PUSCH transmission overlaps with a cell-specific SRS bandwidth partially or fully, it is not mapped to a last SC-FDMA symbol within a subframe configured with a corresponding cell-specific SRS; (4) it is not mapped to a part of SC-FDMA symbol reserved for SRS transmission possible in UE-specific aperiodic SRS subframe; and (5) if UE is configured with multiple TAG, it is not mapped to a port of SC-FDMA symbol reserved for possible SRS transmission in UE-specific periodic SRS subframe within a specific serving cell.

For details of physical resource mapping for antenna port p, Paragraph 5.3.4 of v12.1 version of 3GPP TS36.211 specifications can be referred to.

1.3 Problems of mmWave

An existing ray scanning scheme has a small cell boundary due to the omniantenna property of mmWave and a resolvable ray is eventually detected from a small cell area only. Hence, how to raise the probability of detection of a resolvable ray without the help of a beamforming gain on ray scanning is a major problem. Moreover, since an mmWave link sensitively changes in a link environment according to a location environment of a user equipment, acquisition of site-specific initial environment information is a major problem as well.

Figure 2:
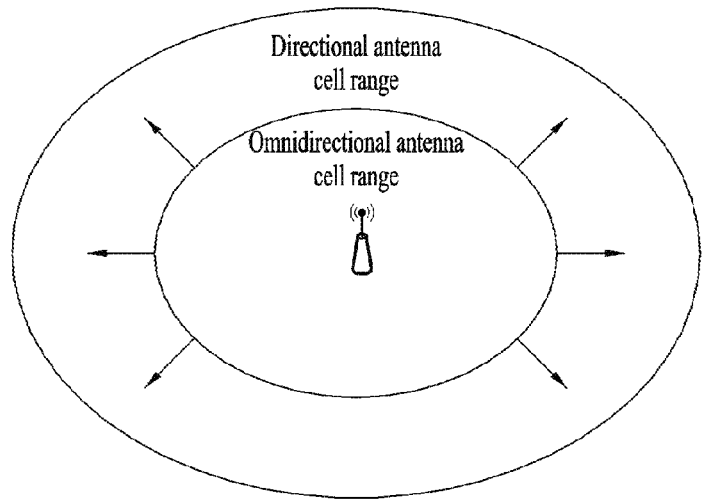
FIG. 2 is a diagram showing one example of cell radiuses that can be covered by an omnidirectional antenna and a directional antenna, respectively.

FIG. 2 is a diagram showing one example of cell radiuses that can be covered by an omnidirectional antenna and a directional antenna, respectively.

Referring to FIG. 2, a range of a cell covered by an omnidirectional antenna is wider than a cell range covered by a directional antenna. When a directional antenna is used in mmWave, there is a problem that a range gain of a beamforming is reduced by about −20 dB. Hence, although it is preferable to use an omnidirectional antenna, a case of mmWave has a problem that channel characteristic rapidly changes according to a user location.

There are the above-mentioned problems due to the property of the mmWave technology that uses the omnidirectional antenna. Therefore, the present invention is directed to overcome the above problems and propose methods of increasing a cell range coverable by an omnidirectional antenna up to a range covered by a directional antenna.

2. Scanning Method for Directional Antenna

2.1 Beam Scanning Method

Beam scanning methods are schematically described as follows.

Figure 3:
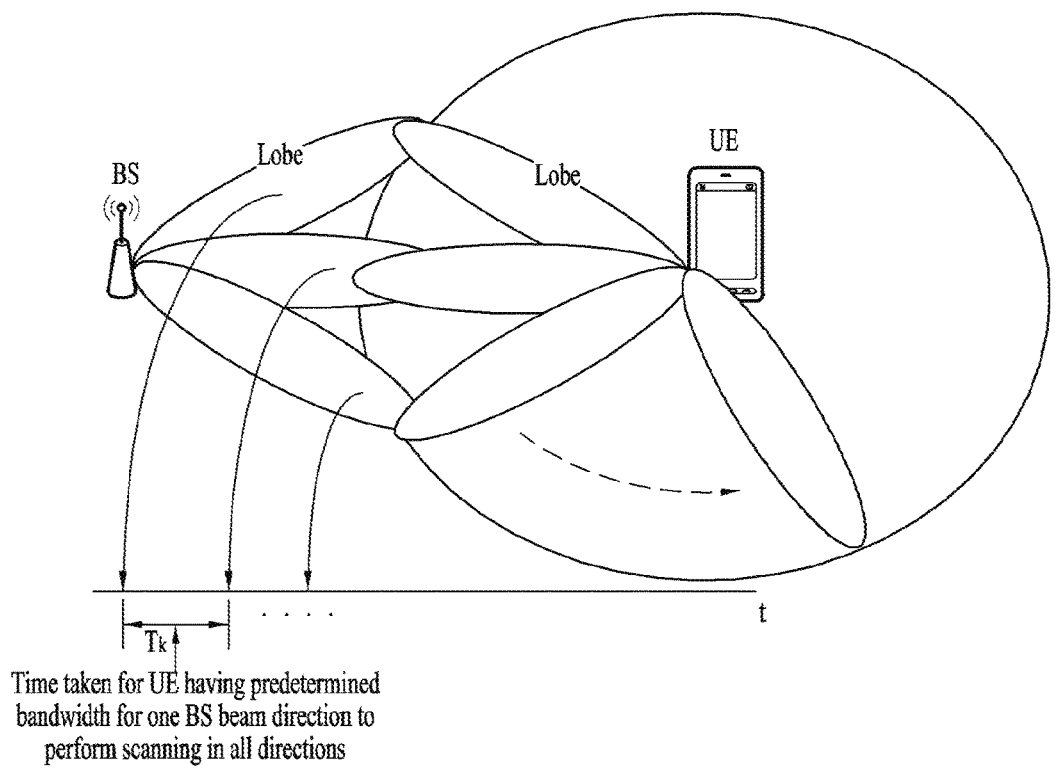
FIG. 3 is a diagram showing one example of an initial stage of a received beam scanning for a transmitted beam scanning.
Figure 4:
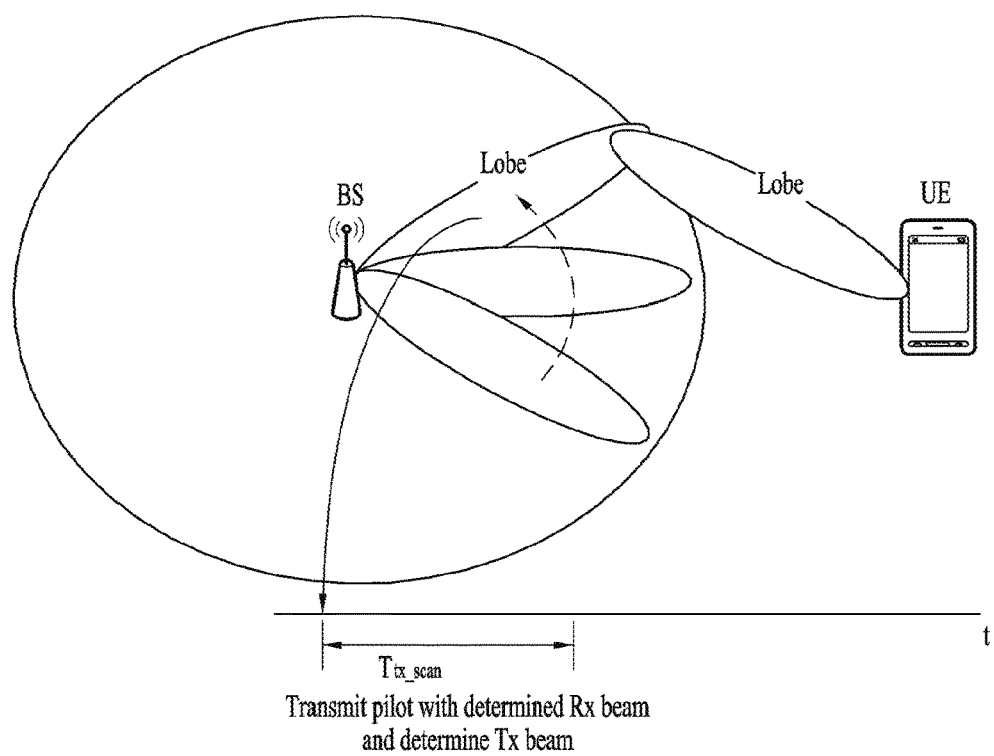
FIG. 4 is a diagram showing one of methods for performing a beam scanning in a transmitting end after fixing a received lobe index in a receiving side.

FIG. 3 is a diagram showing one example of an initial stage of a received beam scanning for a transmitted beam scanning FIG. 4 is a diagram showing one of methods for performing a beam scanning in a transmitting end after fixing a received lobe index in a receiving side.

If a transmitted beam codebook of a base station is determined in an initial stage of a beam scanning, while a corresponding transmitted beam is fixed, a receiving side, i.e., a user equipment derives a PDP (power delay profile) according to each beam by rotating a received beam scanning at 360°. In this case, the user equipment selects an index of a received lobe having a ray with a biggest power among the detected PDPs. Herein, the lobe means each radiation group in case that energy distribution of electric waves radiated from an antenna is divided in several directions. Namely, it means a prescribed form of a beam in performing a beam scanning.

Formula 1 is used to calculate SNR of each lobe detected by a user equipment.

$$\underset{i}{\mathrm{argmax}} |H_i^{(k)} w_i|^2 \frac{p_i^2}{\sigma_n^2} \quad \text{[Formula 1]}$$

In Formula 1, $H_i^{(k)}$ means a radio channel of an $i^{th}$ lobe for a transmitted beam k, $w_i$ means a precoding matrix, $p_i$ means a received power, sigma ($\sigma$) means a size of noise, sigma square means a power of noise.

When a time for completing a received (Rx) beam scanning for a fixed transmitted (Tx) beam lobe is defined as $\tau_k$, as shown in FIG. 3, $\tau_k$ value may be defined as Formula 2.

$$\tau_k = N(\tau_{excess\_delay} + \tau_{prop\_delay} + \tau_{process\_delay}) \quad \text{[Formula 2]}$$

In Formula 2, $\tau_{excess\_delay}$ is an excess delay spread value meaning a maximum delay time required for a receiving end to perform a beam scanning repeatedly, $\tau_{prop\_delay}$ a transmission delay value, $\tau_{process\_delay}$ means a PDP measurement time for each received (Rx) beam lobe and a strong ray detection time, and N means the number of receiving side beam lobes.

The receiving end repeats the above process by changing the entire transmitted (Tx) beam lobes 1~K at 360°. Hence, a beam scanning complete time of the receiving end is $K\tau_k$. Herein, K means the number of the entire transmitted (Tx) beams.

Referring to FIG. 4, if a user equipment that is a receiving end completes a beam scanning, it sends a pilot signal to an mmWave base station again. Thereafter, the user equipment performs 360° beam scanning to determine a transmitting side lobe index. Hence, a time of completing a Tx/Rx beam scanning becomes $K\tau_i + \tau_{tx\_scan}$.

Table 4 defines parameters for beam scanning complete time measurement.

TABLE 4

| | |
|---|---|
| $\tau_{excess\_delay}$ | 1 us |
| $\tau_{prop\_delay}$ | 5 us |
| $\tau_{process\_delay}$ | 670 us |
| N (beamwidth = 36 degree) | 100 (vertical + horizontal) |
| K (beamwidth = 36 degree) | 100 (vertical + horizontal) |
| $\tau_{tx\_scan}$ | 100*670 us |

If parameters for a beam scanning are defined as Table 4, a total Tx/Rx beam scanning time becomes about 100*100*(1+5+670)+100*670=6.827 sec. Namely, it can be observed that overhead amounting to a considerably long time is generated.

Yet, channel characteristic varies according to user's instant motion in a narrow cell coverage due to mmWave property. If almost 7 seconds are consumed for the beam scanning, it causes a problem that an mmWave service appropriate for the varying channel characteristic cannot be provided. Therefore, for an mmWave link connection through a general beam scanning, a simpler processing method is required.

2.2 Ray Scanning Method

Figure 5:
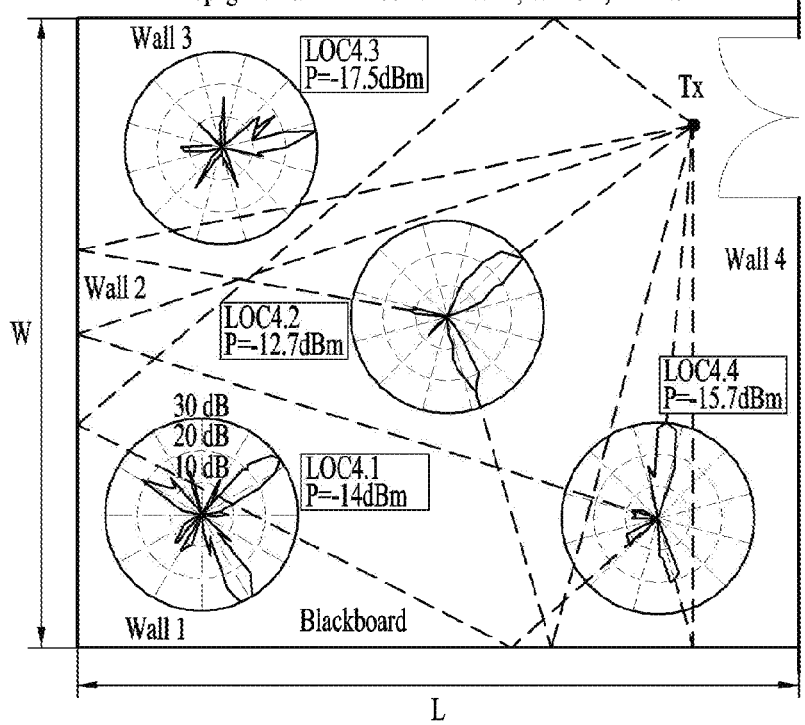
FIG. 5 is a diagram showing one example of PAS distribution according to a location of each transceiving end on 60 GHz band.
Figure 5:
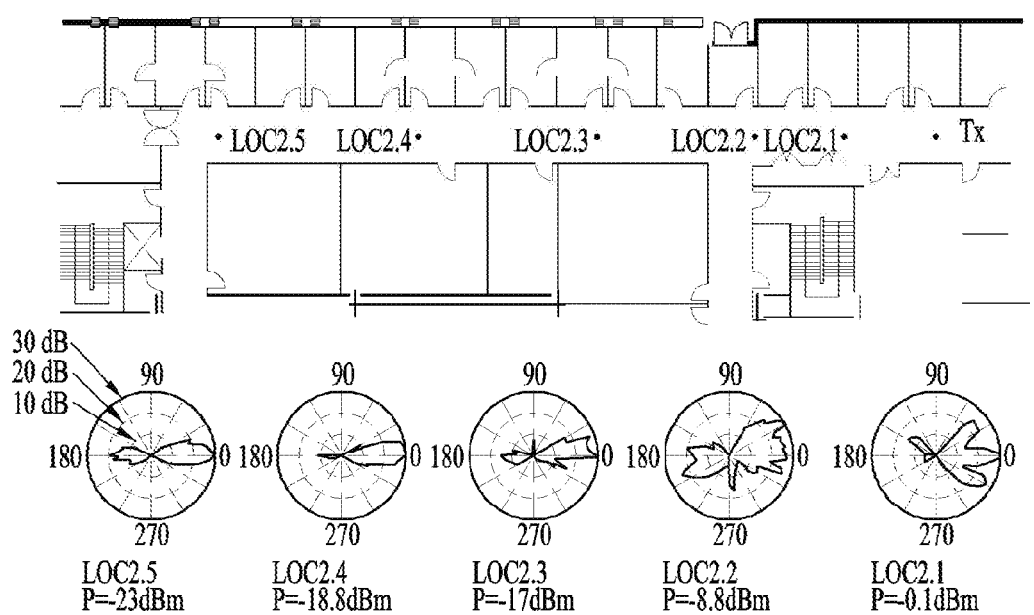

FIG. 5 is a diagram showing one example of PAS distribution according to a location of each transceiving end on 60 GHz band. Particularly, FIG. 5 (a) shows a measurement state of indoor AoA (angle of arrival) and FIG. 5 (b) shows a measurement state of AOA on a corridor in a building.

Like FIG. 5, according to the space environment property of a reception location. it can be observed that PAS indicating a power amount according to an antenna angle of a user equipment changes variously. In mmWave using a high frequency band, the environmental property of the user equipment appears more clearly in comparison with a low frequency band.

Figure 6:
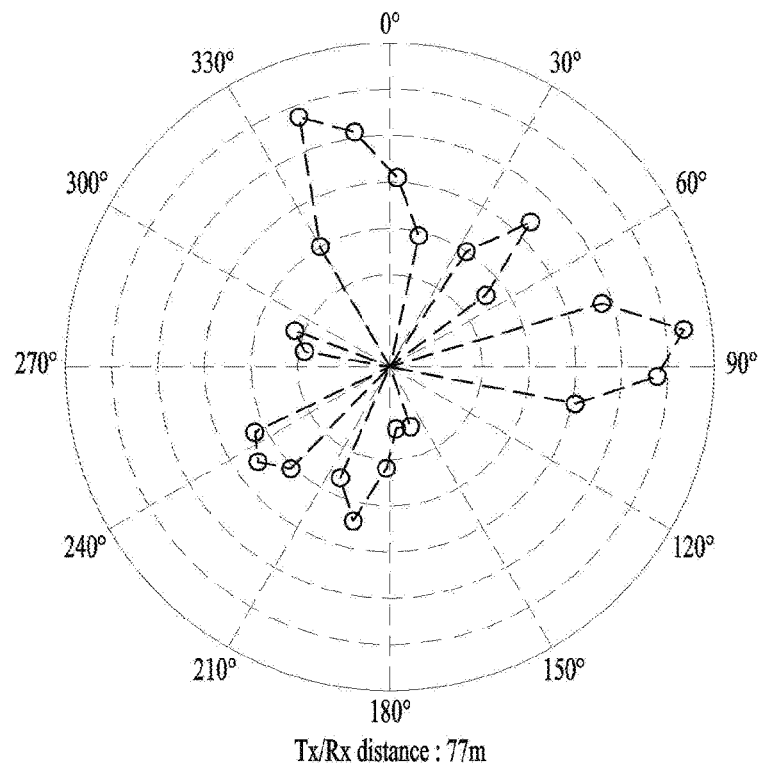
FIG. 6 is a diagram showing one example of PAS distribution according to a location of each transceiving end on 28 GHz band.
Figure 6:
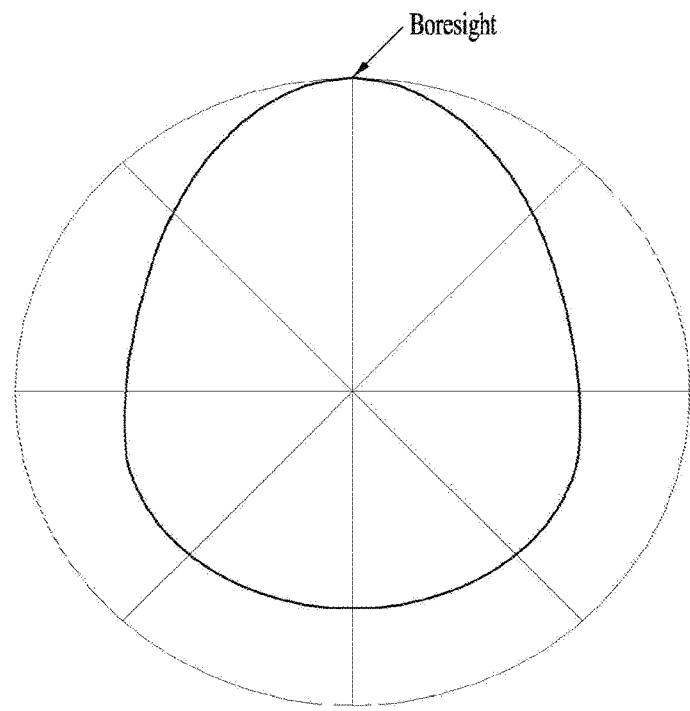

FIG. 6 is a diagram showing one example of PAS distribution according to a location of each transceiving end on 28 GHz band. FIG. 6 (a) shows a PAS measurement result in a city area corresponding to NLoS (non line of sight) environment and FIG. 6(b) shows a PAS measurement result in a general LoS (line of sight) environment.

Through measurement, Rappaport team shows that PAS is determined according to regional location features of a receiver in NLoS environment (i.e., situation that link is connected owing to reflection and refraction by buildings, etc.) on 28 GHz band similar to 60 GHz band. Such a result predicts that a reception power is sufficiently reduced if AoA is further twisted with reference to boresight in a general LoS environment and that a reception power change will appear for each AoA according to the environmental features.

Therefore, if an mmWave user equipment analyzes the unique features for a wireless environment through a scanning scheme based not on beamforming but on ray scanning, such an analysis can be usefully used as a tool for obtaining a lobe of a space candidate or the like on a beam scanning or providing information to enable a receiver to detect resolvable rays distributed variously.

2.3 Relation Between Unique Environmental Element (PDP/PAS) and Directional Antenna Using a directional antenna and beamforming in an mmWave system obtains a beam gain and should be basically accompanied to extend an mmWave cell boundary restricted by the mmWave unique property. Yet, the unique property of the mmWave link is changed due to the use of the directional antenna and the beamforming.

Figure 7:
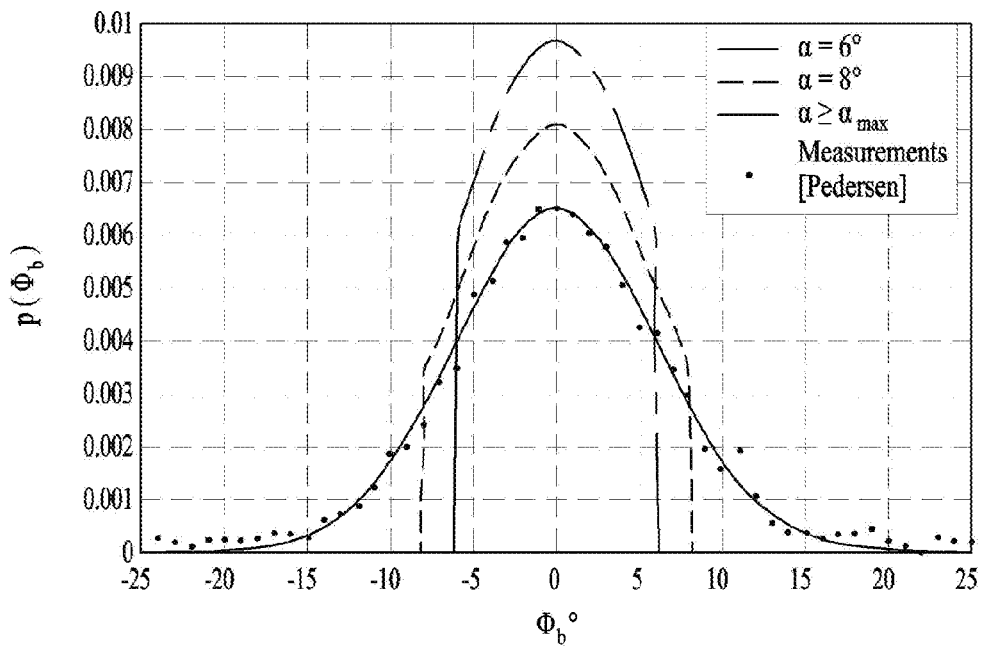
FIG. 7 is a diagram showing one example of effect for a directional antenna in an mmWave system.
Figure 7:
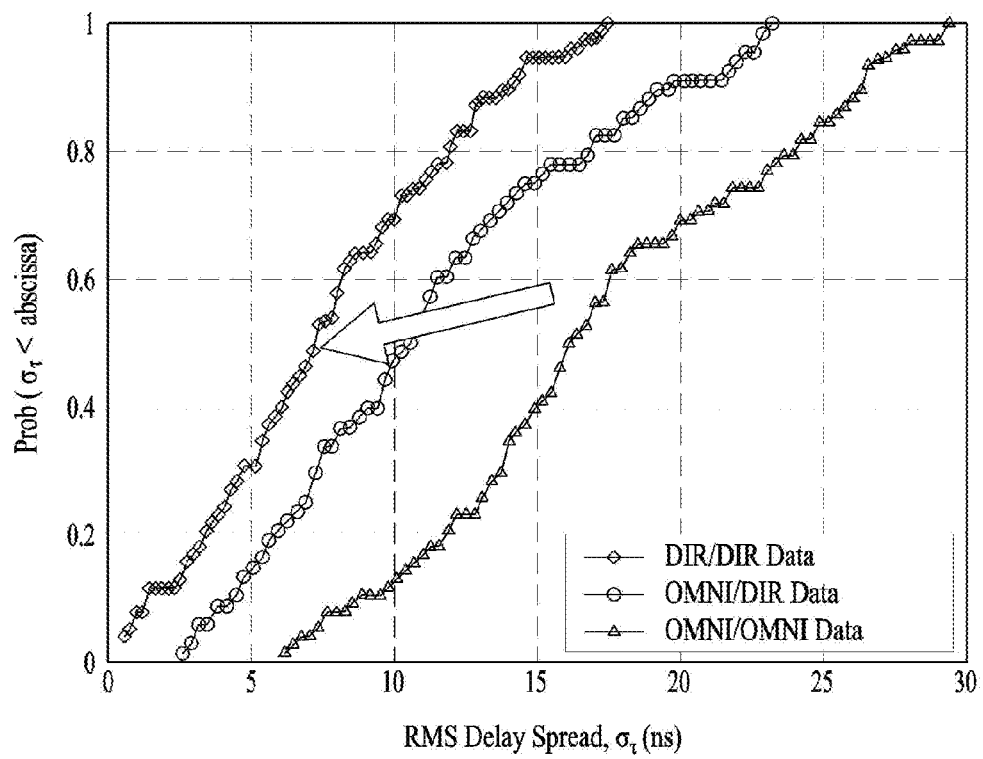

FIG. 7 is a diagram showing one example of effect for a directional antenna in an mmWave system. Particularly, FIG. 7 (a) shows a variation of PAS according to bandwidth, and FIG. 7 (b) shows RMS DS change by a directional antenna.

In FIG. 7 (a), α means a bandwidth. Generally, PAS has distributions of laplacian/uniform/Gaussian and the like according to the environmental features. Yet, since a range of the bandwidth is restricted due to the use of the directional antenna and the beamforming, the distribution is changed into truncated laplacian/Gaussian or the like.

Due to the limited AoA like FIG. 7 (b), a delay spread value is reduced as well. Hence, the environmental property in using a beamforming in an mmWave link cannot be regarded as the unique mmWave link environmental property.

Hence, for the environmental property analysis and information acquisition of the unique mmWave link, an omnidirectional antenna based ray scanning method is required.

3. Ray Scanning Method for Omnidirectional Antenna in mmWave System

Embodiments of the present invention provide methods for efficiently performing initial ray scanning on mmWave link. Moreover, embodiments of the present invention provide methods for improving resolvable ray detection of mmWave link through Tx/Rx pilot signal configuration per mmWave link port and obtaining mmWave unique feature information (PAS, PDP) and the like through a ray scanning.

Figure 8:
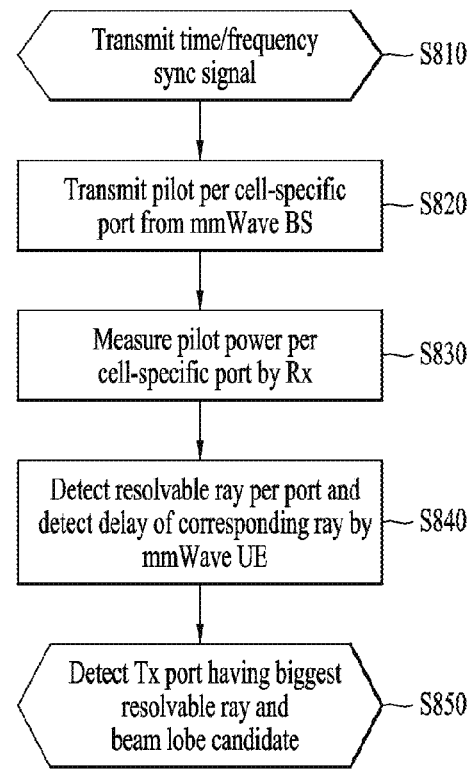
FIG. 8 is a diagram showing one example of a ray scanning method used in an mmWave system.

FIG. 8 is a diagram showing one example of a ray scanning method used in an mmWave system.

A base station of an mmWave system periodically broadcasts a sync signal to match time and/or frequency sync [S810].

The base station transmits a pilot or reference signal per cell-specific port [S820].

A receiving end (e.g., user equipment) of the mmWave system measures a reception power for the pilot or reference signal transmitted per cell-specific port [S830].

The user equipment detects a resolvable ray per port and a time delay value of the detected ray [S840].

The user equipment detects a transmitting port at which g a resolvable ray having a largest reception power exists. And, the user equipment detects a beam lobe candidate for the corresponding transmitting port [S850].

Through the above process, the base station and user equipment in the mmWave system can perform a ray scanning. The user equipment and/or the base station can reduce the complexity to be smaller than that of an existing beam scanning method by a candidate beam tracking on performing a beam scanning through information obtainable after the ray scanning.

Due to the property of a small mmWave cell region and the property very sensitive to the environmental element in applying the ray scanning scheme to the mmWave system, it is difficult to detect a resolvable ray. Hence, it is preferable to increase methodological diversity for resolvable ray acquisition more than that of a ray scanning scheme performed in an existing cellular system.

A ray scanning method applied to an mmWave system proposed by the present invention may be usable for initial unique channel characteristic analysis and information acquisition of the mmWave system. Particularly, by obtaining mmWave link property information varying sensitively according to a location of a user equipment, it can be used to reduce overhead of a further beam scanning. Hence, in the mmWave system, it is able to use a beam scanning scheme mixed with a ray scanning scheme, and vice versa.

3.1 Sequence Transmitting Method for Per-Port Sync Transmission in mmWave System The sequence transmission to match sync described in this paragraph may be performed in the step S810. To perform the mmWave ray scanning, a base station may transmit a sequence to match time/frequency sync in advance for transmission of a per-port sync signal.

Herein, since the sync signal is configured in a manner of focusing on time sync, a frequency scanning is determined according to capability of a user equipment. In LTE system, the number of resource blocks of a PSS (primary synchronization signal) for a sync signal is 6 and total 63 subcarriers are used.

When a PSS sequence used in a current cellular system is applied, a user equipment can easily detect an initial sync within offset of 7.5 kHz. In this case, if a sync signal supportive of offset of 7.5 kHz is identically used on 30 GHz, it is able to support a user equipment moving at 270 km/h with the same sequence. In doing so, for time sync signal detection for a fast moving user equipment used in an mmWave system, if the user equipment performance support mmWave band (e.g., 30 GHz), the RB number and sequence length for the sync signal transmission can be adjusted.

Figure 9:
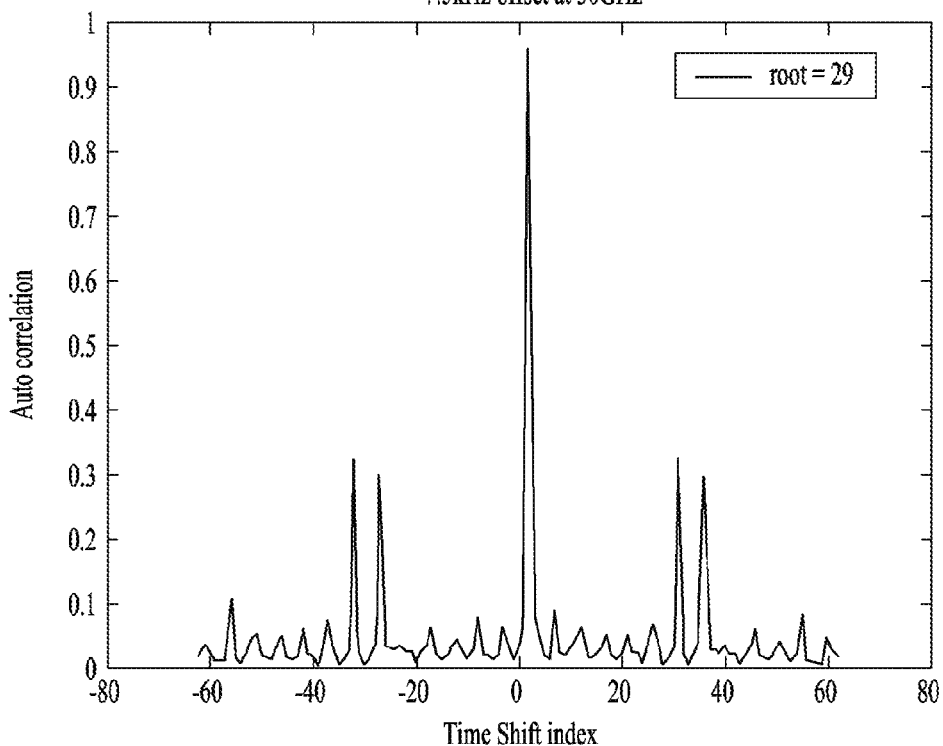
FIG. 9 is a diagram showing a calculation result of auto correlation of a sync signal using 63 based Zadoff-Chu sequences.

FIG. 9 is a diagram showing a calculation result of auto correlation of a sync signal using 63 based Zadoff-Chu sequences.

Referring to FIG. 9, when 7.5 kHz offset is applied (e.g., 270 km/h support at 30 GHz, subcarrier 104.25 kHz), it can be observed that time sync can be matched almost. A root value of this sequence may be temporarily set different between adjacent cells.

Since the mmWave system has UWB (ultra wide band), a transmission of a pilot signal for a ray scanning can be basically performed by a full band transmission scheme using CDM (Code Division Multiplexing) (i.e., similar to IR-UWB) or a multiple partial band transmitting method using OFDM (Orthogonal Frequency Division Multiplexing) (i.e., similar to MB-UWB).

Generally, since an mmWave link has a small multipath delay (e.g., 10 ns and 28 GHz), if a time sync is matched to compensate for a transmission time difference between rays, pilot signals can be transmitted in a manner of being separated per antenna port using TDM (Time Division Multiplexing). According to this method, a receiving side can be easily aware that a strongest resolvable ray is detected from a specific transmitting antenna port. Therefore, the user equipment may beforehand consider receiving a sequence transmission for the time sync match before a ray scanning.

If the sync is matched between the base station and the user equipment, the user equipment may perform a resolvable ray detection in aspect of diversity acquisition through Tx/Rx configuration in advance. In doing so, since the sync between the base station and the user equipment is matched to obtain a location of the detection of a pilot signal for the ray scanning of the user equipment instead of being matched completely, when an mmWave base station transmits a pilot, an mmWave user equipment can detect a sync signal by performing a blind searching on full time of full mmWave band. In a time-frequency sync unmatched state, due to asynchronization between per-port pilot signals, error may be generated from accurate resolvable ray detection performed by the receiving side.

In aspect of preventing such a problem in advance, a sync signal transmission may be a necessary procedure. Moreover, if a frequency sync signal is transmitted through multiple partial band (e.g., MB-UWB scheme), the user equipment requires acquisition of a sync signal to implicitly acquire transmitting antenna port information. Additionally, the user equipment may obtain a temporary cell ID through the sync signal. Hence, the user equipment can perform a cell-specific ray scanning.

Figures 10, 11:
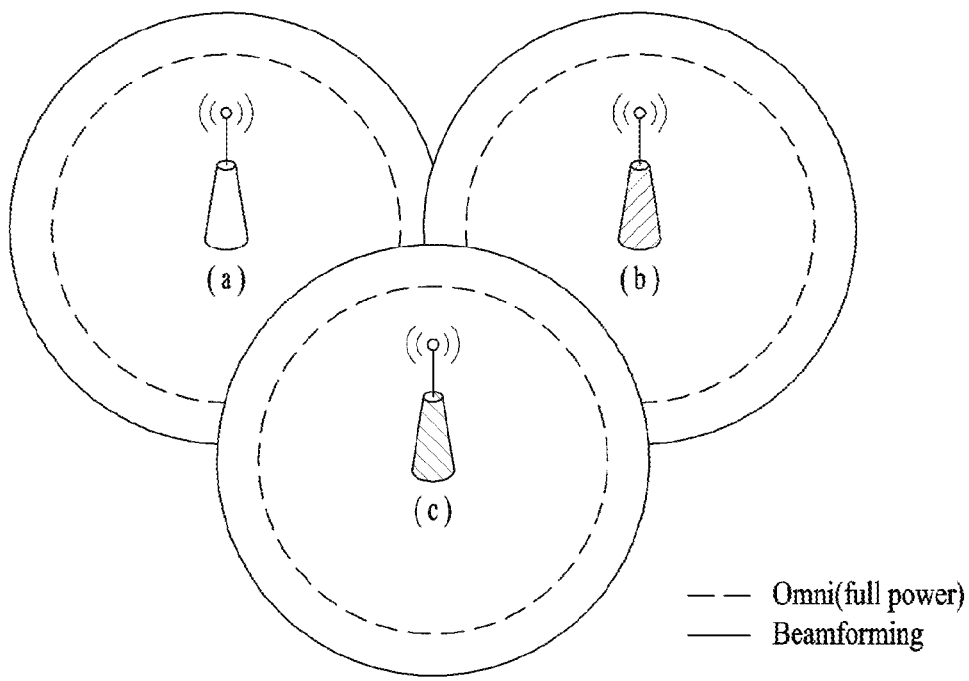
FIG. 10 is a diagram showing cell boundaries according to a ray scanning and a beam scanning in an mmWave system.
FIG. 11 is a diagram showing one example of a configuration pattern for transmitting a pilot signal per cell-specific transmitting antenna port in an mmWave system.

FIG. 10 is a diagram showing cell boundaries according to a ray scanning and a beam scanning in an mmWave system.

In FIG. 10, a dotted line indicates a cell boundary in case that each base station performs a ray scanning using an omnidirectional antenna. And, a solid line indicates a cell boundary in case that each base station performs a beam scanning using a directional antenna.

3.2 Pilot Signal Transmission per Cell-Specific Antenna Port in mmWave System

The pilot signal transmitting methods in the following description may be performed in the step S820.

In order for a user equipment to obtain more resolvable rays in an mmWave system, a base station may configure a pilot signal per cell-specific antenna port to be transmitted with a maximum transmit power.

The base station and/or the user equipment can determine a configuration pattern for pilot signal transmission based on a temporary cell identifier (ID) obtained through a sync signal and configuration information on each temporary cell identifier.

3.2.1 Configuration Pattern for Transmitting Pilot Signal

FIG. 11 is a diagram showing one example of a configuration pattern for transmitting a pilot signal per cell-specific transmitting antenna port in an mmWave system.

Referring to FIG. 11, an antenna port 1 of a base station is configured to transmit a sync signal on a first RB and transmit a pilot signal on a second RB with a maximum transmit power. An antenna port 2 of the base station is configured to transmit a sync signal on a first RB and transmit a pilot signal on a third RB with a maximum transmit power. Namely, sync signals are transmitted on the first RB from all antenna ports of the base station, respectively and pilot signals are configured to be transmitted on RBs failing to overlap with each other by TDM, respectively. By such a scheme, an $N^{th}$ antenna port of the base station may be configured to transmit a sync signal on a first RB and transmit a pilot signal on an $(N+1)^{th}$. Herein, a size of the RB for transmitting the pilot signal may be set longer than a maximum delay spread value.

If pilot signals are transmitted in the pilot signal configuration pattern configured by the scheme shown in FIG. 11, a user equipment has an increasing probability of detecting a resolvable ray per antenna port and a loss of a transmission power for transmitting a pilot signal from a base station can be reduced.

The configuration information set between the user equipment and the base station in advance in order to set the configuration pattern of pilot signals shown in FIG. 11 may include: (1) maximum transmit power per antenna port; (2) pilot transmission pattern per cell-specific antenna port; (3) length of cell-specific ray scanning pilot signal; and (4) cell-specific ray scanning pilot sequence index.

The configuration pattern for transmitting the pilot signal per cell-specific antenna port and the configuration information such as the length of the pilot signal, the sequence index for the pilot signal and the like may be determined after obtaining the temporary cell identifier obtained owing to the synchronization between the user equipment and the base station. In order to know the full PDP property per antenna port of the base station, the length of the pilot signal may be set based on a maximum excessive delay spread value in a corresponding cell.

3.2.2 Method of Transmitting Pilot Signal for Ray Scanning through Full Band

Figure 12:
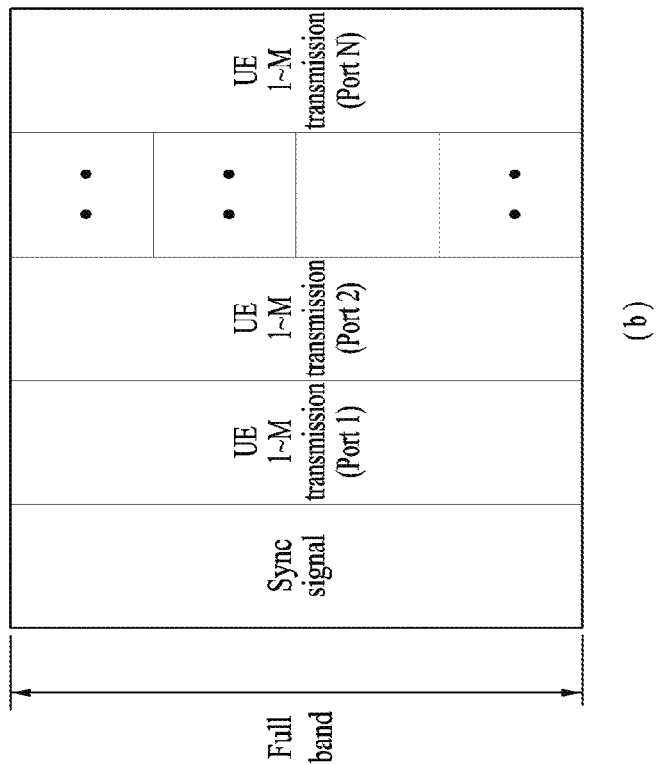
FIG. 12 is a diagram showing one example of a pilot signal configuration pattern in case of transmitting a pilot signal for a ray scanning through full frequency band of a corresponding base station.
Figure 12:
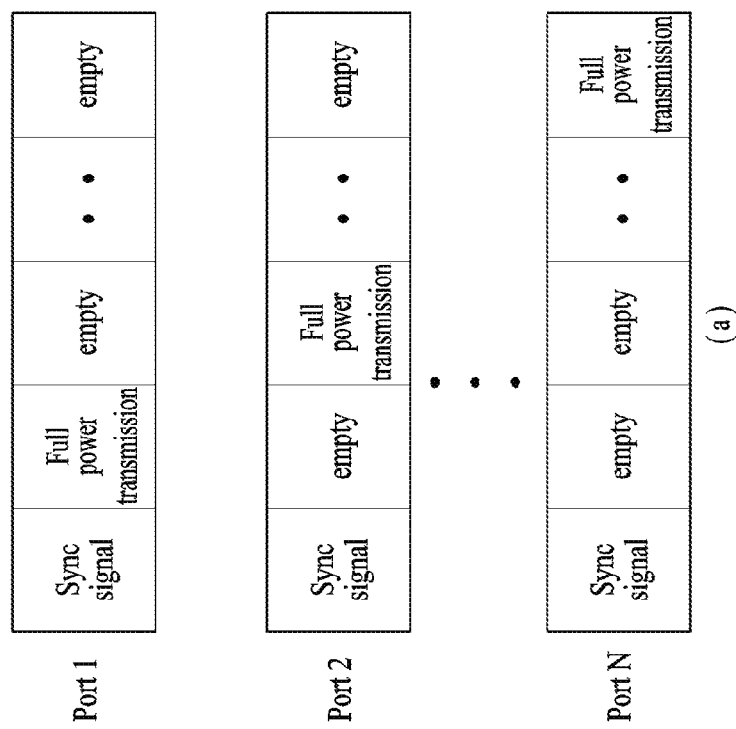

FIG. 12 is a diagram showing one example of a pilot signal configuration pattern in case of transmitting a pilot signal for a ray scanning through full frequency band of a corresponding base station.

Herein, FIG. 12 (a) is almost identical to FIG. 12 (a) but assumes that a frequency is set to a full band in a corresponding cell. FIG. 12 (b) shows a configuration of assigning a pilot signal between time and frequency.

Referring to FIG. 12 (b), a base station matches sync with user equipments 1~M in a cell by transmitting a sync signal through a full band and transmits different pilot signals per transmitting antenna port to the user equipments 1~M. in this case, the transmission of the pilot signals for two or more user equipments may be divided by CDM and the division for antenna ports of the corresponding pilot signals may be performed by TDM. In such a case, assume that temporal synchronization is made between the user equipments and the base station in the cell through the sync signal.

The reason for dividing the pilot signals by CDM in FIG. 12 is to enable more accurate power measurement of each user equipment when multiple user equipments are located at different sites in the cell. In this case, for the CDM scheme, each of the user equipments may have a unique CMD code in advance.

If all mmWave user equipments in the mmWave system are synchronized with a base station, each user equipment may obtain PDP information per antenna port excellently. When a pilot signal is transmitted to a mobile user equipment by full band spread, PDP detection can be effectively performed in the user equipment.

Yet, if the number of antenna port increases, temporal overhead increases. If synchronization between the user equipment and the base station is not established, the user equipment may detect a wrong PDP per antenna port. For N transmitting antenna ports, a transmission time of the entire pilot signals becomes $N \times \tau_{excess\_delay}$. Yet, $\tau_{excess\_delay}$ is preferably set greater than an excess delay spread value in the corresponding cell. For instance, a value of $\tau_{excess\_delay}$ may be set to about 1 μs in 28 GHz dense city environment.

3.2.3 Method of Transmitting Pilot Signal per Cell-Specific Port by FDM

Figure 13:
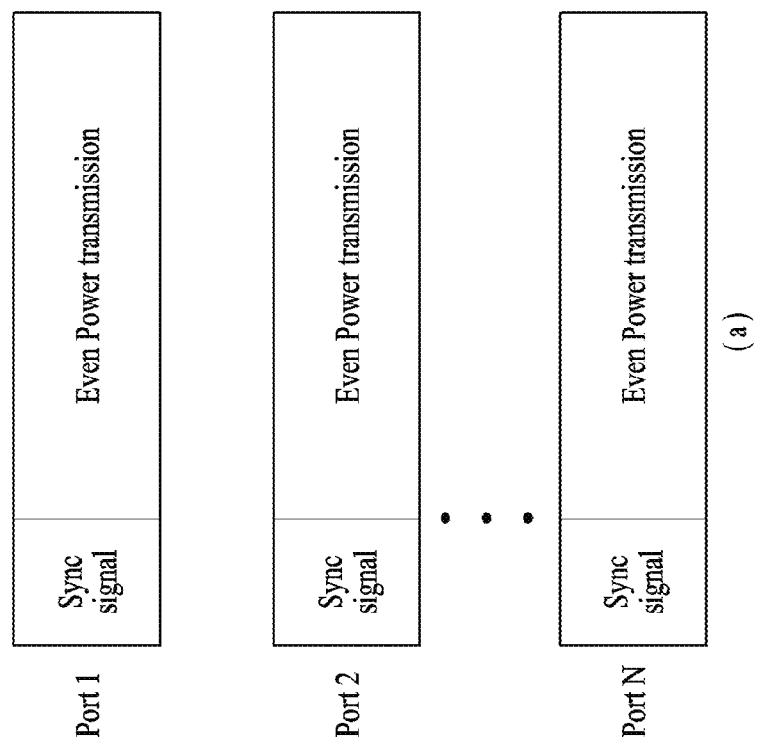
FIG. 13 is a diagram showing a method of transmitting a pilot signal for a ray scanning through a partial band.

FIG. 13 is a diagram showing a method of transmitting a pilot signal for a ray scanning through a partial band.

FIG. 13 (a) shows configuration for transmitting a pilot signal for a ray scanning per transmitting antenna port, and FIG. 13 (b) shows configuration for enabling the pilot signal having the configuration of FIG. 13 (a) to be transmitted through a partial band.

Referring to FIG. 13 (a), ports Port 1 to Port N are configured to transmit sync signals in the first place, respectively. And, all the ports are then configured to transmit pilot signals with even transmit power, respectively. Referring to FIG. 13 (b), the sync signal described in FIG. 13 (a) may be transmitted using a full frequency band. Yet, each of the ports may be transmitted through a different partial band of an in-cell frequency.

A method for the transmitting antenna ports to transmit pilot signals by dividing frequency based on FDM has overhead per antenna port smaller than that of a scheme of dividing a pilot signal by CDM and TDM. Yet, if the number of the transmitting antenna ports increases, there is a disadvantage that a band used for a ray scanning per antenna port should be decreased. And, a subcarrier spacing is decreased as much as an amount of the decreasing partial bands corresponding to the fixed pilot signal number. Hence, overhead on a time axis may increase. Moreover, since the transmitting antenna ports of a base station transmit pilot signals with event transmit power, probability of resolvable ray detection in a user equipment may be lowered. Besides, if there are many user equipments moving in a cell, a process for performing frequency compensation on each of the user equipments is required.

Therefore, the FDM scheme described in the present paragraph is a scheme useful in performing a wideband ray scanning when the number of cell-specific antenna ports is small.

3.3 Method of Repeatedly Transmitting Pilot Signal for Ray Scanning

Methods for repeatedly transmitting a pilot signal for a ray scanning in an mmWave system are described as follows.

For diversity of UE's mmWave site-specific information acquisition and PDP acquisition for each antenna port, a base station may be configured to transmit a pilot signal repeatedly prescribed times in consideration of overhead of the pilot signal.

In this case, a repetition pattern may be set different according to a temporary cell identifier. The repetition count may be set equal or different per transmitting antenna port. In doing so, the base station may determine the repetition count of the pilot signal to enable acquisition of ray scanning overhead of the user equipment, the repetitive PDP acquisition per antenna port and the meaningful PAS estimation. And, the base station may notify information on the count of the pilot signal repeatedly transmitted from each antenna port to the user equipment through upper layer signaling (e.g., RRC signal).

Figure 14:
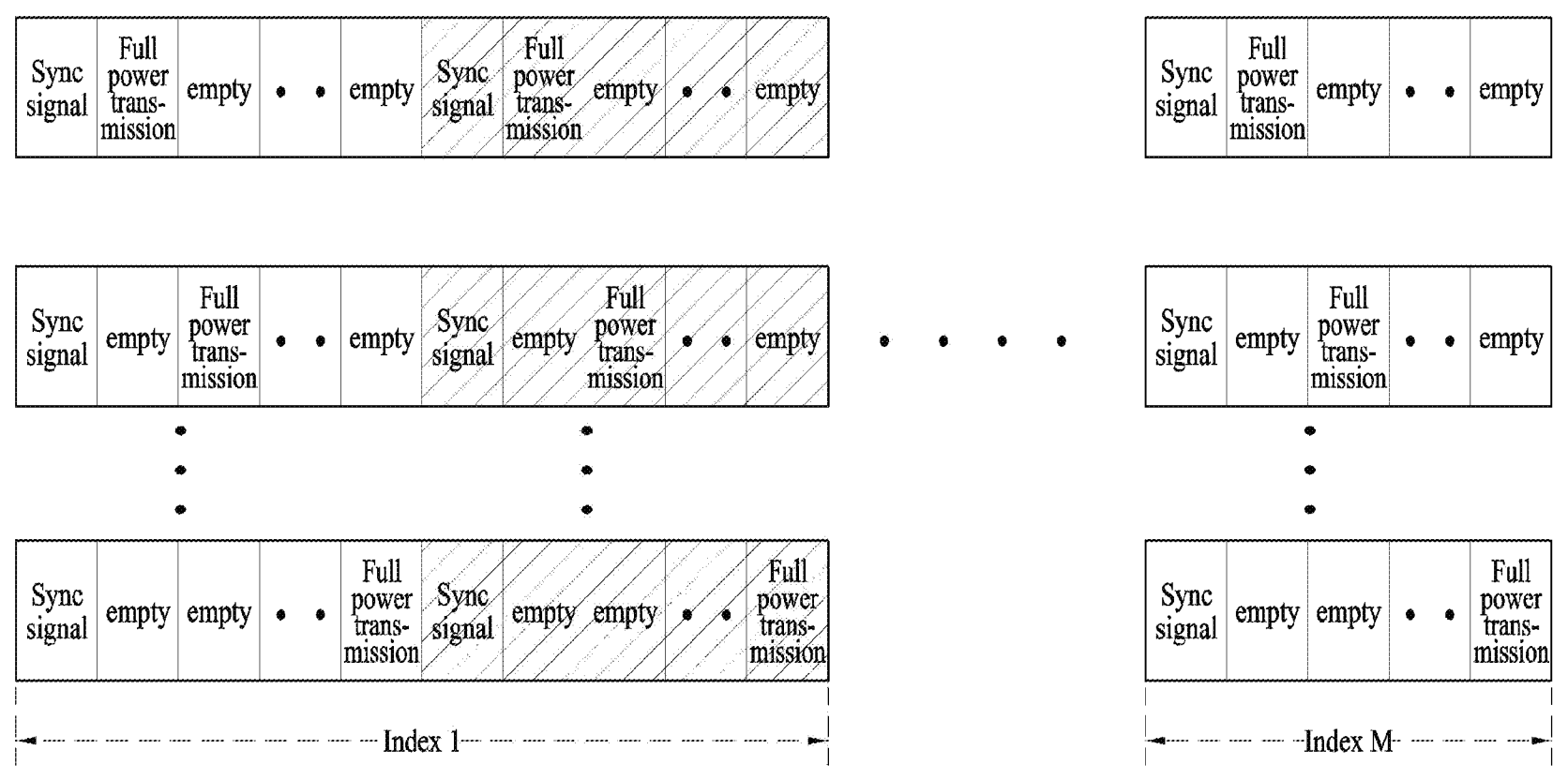

FIG. 14 is a diagram showing one of pilot signal configuring methods for transmitting a pilot signal for a ray scanning by each period M.

Referring to FIG. 14, antenna ports of a base station sequentially transmit pilot signals in a single index duration. In doing so, a pattern of the pilot signals transmitted in the single index duration may use one of the methods described with reference to FIGS. 11 to 13. FIG. 14 is a diagram showing a case of using the pilot signal transmission pattern of FIG. 11.

In this case, assuming a case that a transmission period of a pilot signal is set to M, the base station sequentially transmits pilot signals of all antenna ports in a first index and then transmits pilot signals of all antenna ports in $M^{th}$ index again in sequence.

Figure 15:
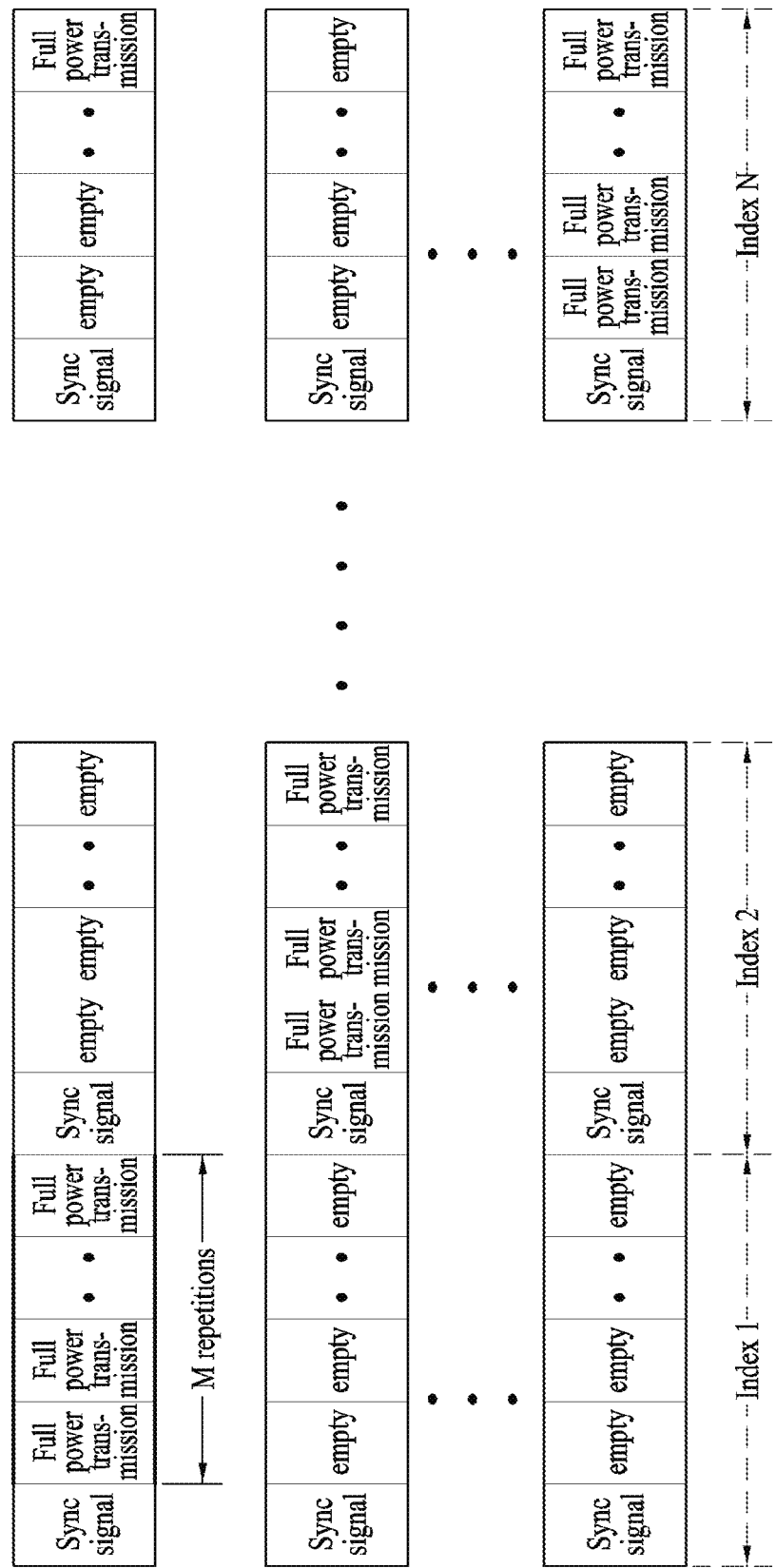
FIG. 15 is a diagram showing one of pilot signal configuring methods for transmitting a pilot signal per antenna port M times repeatedly.

FIG. 15 is a diagram showing one of pilot signal configuring methods for transmitting a pilot signal per antenna port M times repeatedly.

Referring to FIG. 15, after transmitting a sync signal through a first antenna port in a first index Index 1, a base station may transmit a pilot signal M times to a user equipment using M RBs. Moreover, after transmitting a sync signal through a second antenna port in a second index Index 2, the base station may transmit a pilot signal M times to the user equipment using M RBs. The base station performs such a process up to $N^{th}$ antenna port.

Referring to FIG. 15, all antenna ports transmit sync signals in every index duration. Yet, while a prescribed antenna port repeatedly transmits a pilot signal M times, other antenna ports do not transmit pilot signals. Moreover, if a prescribed antenna port transmits a pilot signal, it transmits the pilot signal with a maximum transmit power.

There is an effect of extending a cell coverage managed by a base station that transmits a pilot signal by the method shown in FIG. 15. Namely, even if the base station performs a ray scanning using an omnidirectional antenna, a cell coverage can be extended advantageously.

The repetitive transmission patterns of the pilot signals described with reference to FIG. 14 and FIG. 15 determine a ray scanning pilot pattern in mmWave link with reference to what kind of channel environment will be used to transceive pilot information in performing an mmWave ray scanning.

For instance, the pilot repetitive transmission pattern shown in FIG. 14 may be used for general channel characteristics between an mmWave base station and a user equipment in a corresponding cell and a general ray scanning required situation (i.e., when a non-coherent channel status is used). And, the pilot repetitive transmission pattern shown in FIG. 15 may be used for the purpose of acquisition of mmWave link property information of a specific temporal section per antenna port and the purpose of a ray scanning per antenna port.

3.3.1 Method of Determining Count of Repetitions of Pilot Signal

Figure 16:
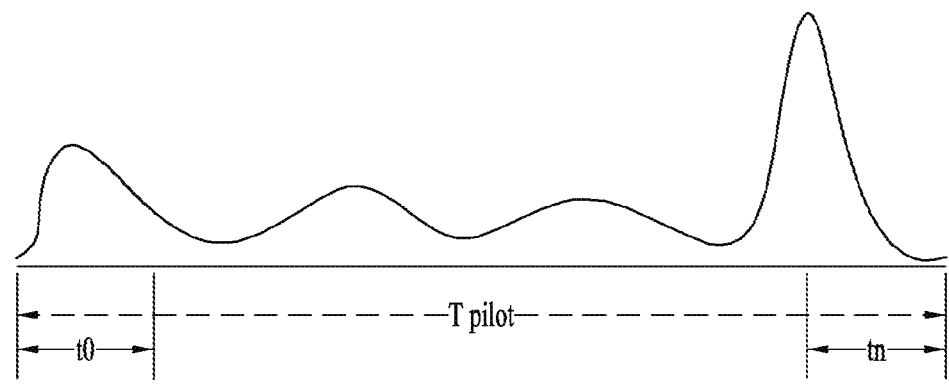
FIG. 16 is a diagram showing a PDP change during a transmission of a single pilot signal from a transmitting antenna port and one example of a sample collecting length.
Figure 17:
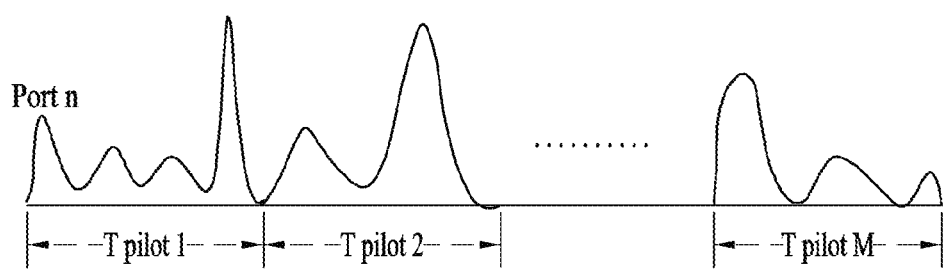
FIG. 17 is a diagram showing a PDP change during repeated transmissions of pilot signals from a transmitting antenna port and one example of a sample collecting length.

FIG. 16 is a diagram showing a PDP change during a transmission of a single pilot signal from a transmitting antenna port and one example of a sample collecting length. FIG. 17 is a diagram showing a PDP change during repeated transmissions of pilot signals from a transmitting antenna port and one example of a sample collecting length.

Based on FIG. 16 and FIG. 17, a method of estimating AoA using a power delay profile is described as follows.

$$F_{ML} = \underset{A}{\arg\min} Tr\left[(I - A(A^H A)^{-1} A^H) R_{y(t)y(t)}\right] \quad \text{[Formula 3]}$$

A received signal detected by a user equipment is represented as y(t)=As(t)+N(t). Herein A is an unknown AoA parameter matrix and N(t) means a noise. In Formula 3, $R_{y(t)y(t)}$ is an autocorrelation matrix of y(t).

To solve Formula 3, AoA can be estimated using MODE algorithm. Namely, Formula 3 may be summarized as Formula 4.

$$F_{ML} = \underset{A,s(t)}{\arg\min} \sum_{n=1}^{N_s} (y(t_n) - As(t_n))^H (y(t_n) - As(t_n)) \quad \text{[Formula 4]}$$

In Formula 4, $S(t_n)$ is ML (Maximum Likelihood) estimation and can be calculated as Formula 5.

$$s(t_n) = (A^H A)^{-1} A^H y(t_n) \quad \text{[Formula 5]}$$

A method for AoA estimation problem solution of Formula 5 may use well-known methods such as EM (Expectation Maximization) algorithm, SAGE (Space-Alternating Generalized Expectation-maximization algorithm) algorithm and the like. The base station can estimate AoA with n samplings limited like FIG. 16 in consideration of complexity of a sampling section despite using such algorithms.

Figure 18:
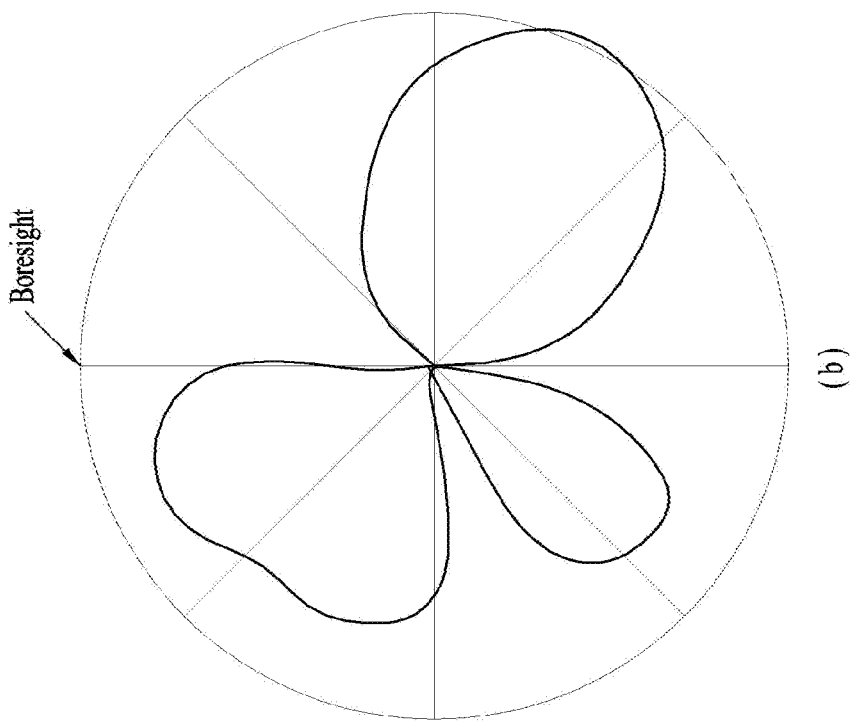
FIG. 18 is a diagram showing AoA estimation per transmitting antenna port and a relation between AoA histogram and real PAS.
Figure 18:
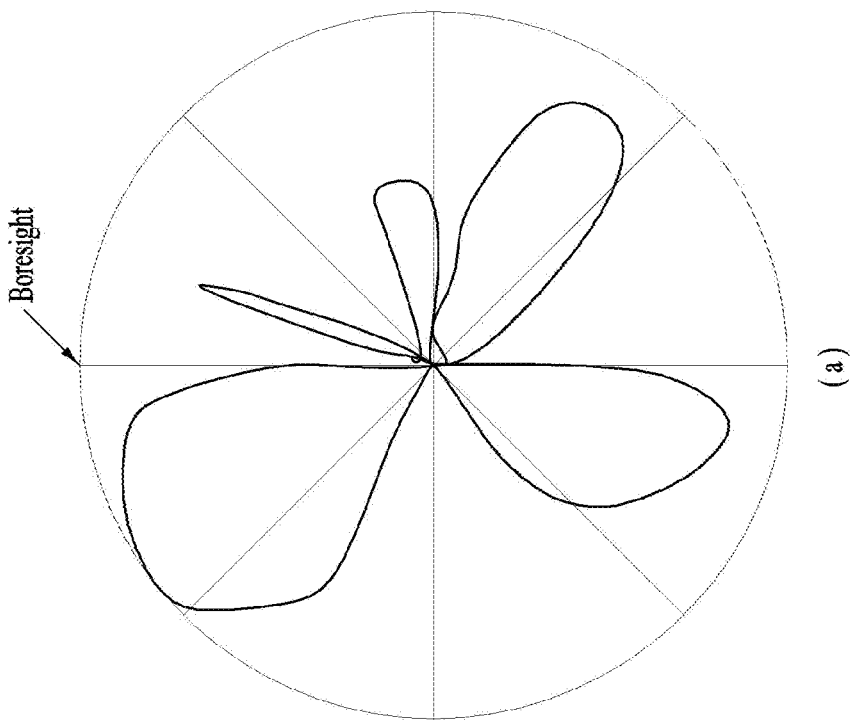

Through this, a single AoA can be estimated per pilot signal. Until an actually measured PAS becomes similar to an AoA histogram configured with estimated AoAs, the base station can determine M pilot signals by performing AoA estimation. FIG. 18 is a diagram showing AoA estimation per transmitting antenna port and a relation between AoA histogram and real PAS. For instance, FIG. 18 (a) shows a real PAS, and FIG. 18 (b) shows one example of an AoA histogram by AoA estimation per antenna port.

Thereafter, the base station determined a repetition count of a pilot signal within a prescribed value in consideration of overhead of pilot signal transmission and UE capability. Formula 6 shows a range of the repetition count M of the pilot signal.

$$M_{min} < M < \Xi_{overhead\_threshold} \quad \text{[Formula 6]}$$

In Formula 6, $M_{min}$ means a minimum pilot transmission count. Namely, $M_{min}$ may be assumed as the count estimated as MSE (mean square error) sense for example when a PAS histogram obtained by estimation becomes similar to a real PAS within a limited tolerance. An overhead threshold may be defined as the maximum pilot signal number capable of obtaining a complexity gain when a pilot signal is transmitted.

A value of $M_{min}$ of Formula 6 can be calculated using MSE (Mean Square Error) estimation like Formula 7.

$$\underset{M_{min}}{\arg} \sum_i \|\hat{\theta}_{hist,i} - \theta\|^2 \leq \varepsilon, \quad \text{[Formula 7]}$$

$$\hat{\theta}_{hist,i} = \frac{\sum_{k=1}^{M} I_{(i)}(\hat{\theta}_{AoA,k})}{M}$$

In Formula 7, $\hat{\theta}_{AoA,k}$ is an AoA estimated value by MSE estimation scheme, $I_{(i)}$ is a cumulated value of the estimated values, and ε is a significant tolerance value, which can be determined in advance by the mmWave base station and user equipment before performing a ray scanning. According to this determining method, cumulation is performed M times in Formula 7 and then $M_{min}$ is derived using the MSE of the estimated AoA histogram obtained through normalization and the real PAS.

Hence, the estimated AoA number becomes M per transmitting antenna port. The base station and/or the user equipment obtains the AoA histogram with the estimated M AoA, thereby obtaining a candidate lobe index. The M value set by this scheme may be set through RRC signal before the ray scanning.

3.4 mmWave Ray Scanning Receiving Method of User Equipment

Figure 19:
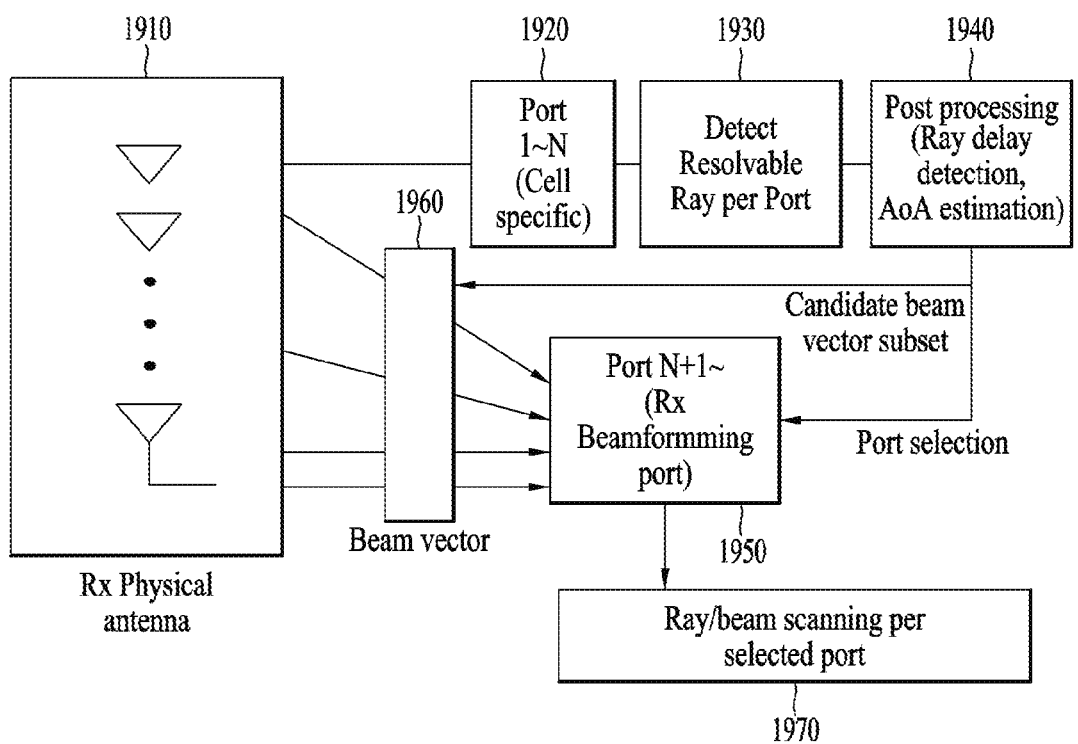
FIG. 19 is a diagram showing one example of configuration of a user equipment device usable for embodiments of the present invention.

FIG. 19 is a diagram showing one example of configuration of a user equipment device usable for embodiments of the present invention.

Referring to FIG. 19, a user equipment has X Rx physical antennas 1910 and the number of cell-specific antenna ports can be set up to N. herein, the mapping relation between the physical antenna and the Rx antenna port can be managed by an antenna port unit 1920. The user equipment includes a detecting unit 1930 for detecting a resolvable ray per antenna port and a post processing unit 1940 for estimating a delay value and AoA of the detected ray. The post processing unit delivers a candidate beam vector subset to the beam vector processing unit 1960, thereby supporting reception of a pilot signal. A Rx beamforming port unit 1950 can perform a beamforming using a port selected by the post processing unit. Namely, a processor 1970 of the user equipment can perform a ray or beam scanning per selected port.

For the detection of a resolvable ray per Tx antenna port, a base station sets a threshold of a transmit power and obtains a candidate received beam vector subset through AoA histogram obtained per cell-specific antenna port. Thereafter, the base station determines a Tx antenna port to which a biggest power will be assigned.

In this case, Tx antenna ports sorted by TDM or FDM per cell-specific Rx antenna port of the user equipment can be assorted. The user equipment selects a Tx antenna port having a biggest received signal, thereby receiving data through the corresponding Tx antenna port.

Figure 20:
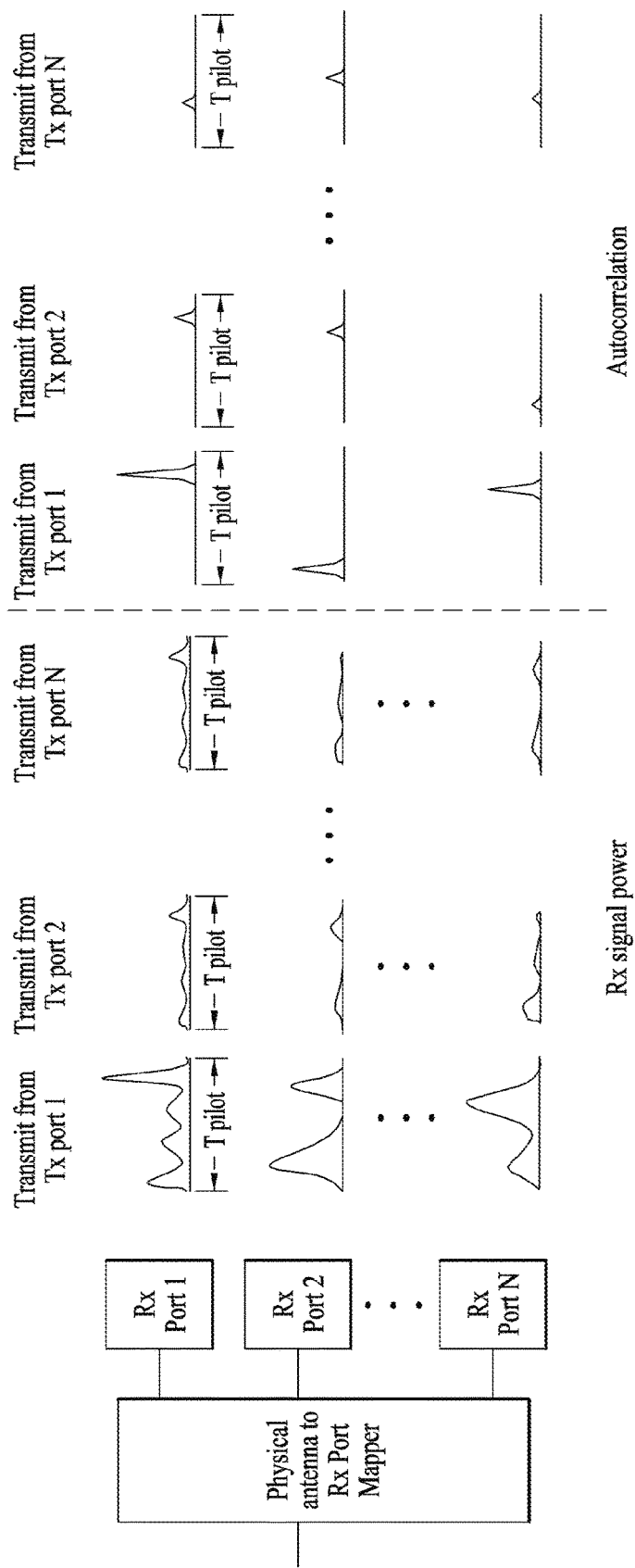
FIG. 20 is a diagram showing one example of received signal power measurement per receiving antenna port and a method of measuring a relay value by sorting a transmitting antenna port at each receiving antenna port.

FIG. 20 is a diagram showing one example of received signal power measurement per receiving antenna port and a method of measuring a relay value by sorting a transmitting antenna port at each receiving antenna port.

A left part of FIG. 20 shows that pilot signals received by the physical antenna 1910 of the user equipment are sorted by each Rx antenna port 1920. Herein, a shape of each pilot signal is represented as a received signal power. A right part of FIG. 20 shows signals detected by the post processing unit 1940 of the user equipment through autocorrelation from the received pilot signals.

In a state of being synchronized with the base station, the Rx user equipment already knows sequences for the resolvable ray detection per Rx antenna port. Moreover, the user equipment can assort Tx antenna ports transmitted per $T_{pilot}$ through TDM. Hence, when a pilot signal is transmitted from a prescribed Tx antenna port of the base station using each ray scanning sequence, the user equipment can be aware whether a biggest resolvable ray is detected from each Rx antenna port. Moreover, through the autocorrelation procedure for the received pilot signals, the user equipment can be aware of whereabout of a time of detecting the corresponding resolvable ray in the corresponding $T_{pilot}$.

Therefore, the user equipment can be aware of detection of a ray having a biggest transmit power per antenna port through the ray scanning step per antenna port, a location of the corresponding ray, and information of Tx antenna port for transiting the ray having the biggest power. Moreover, the user equipment can estimate a candidate beam lobe through repetitive AoA estimation.

5. Implementation Device

Figure 21:
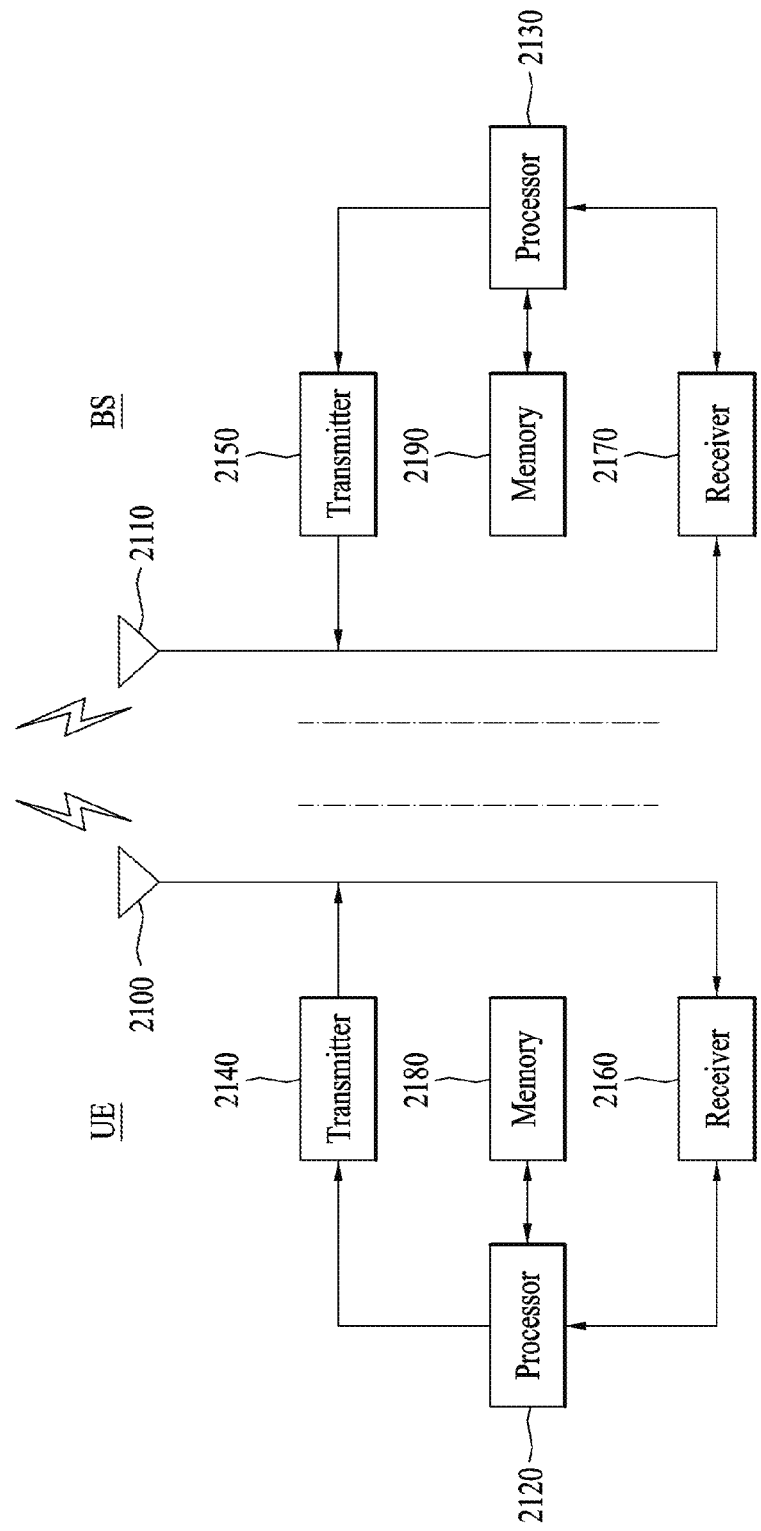
FIG. 21 is a diagram of a device that is a means for implementing the methods described with reference to FIGS. 1 to 20.

A device described in FIG. 21 is a means for implementing the methods described with reference to FIGS. 1 to 20.

A UE (user equipment) can operate as a transmitter in uplink or a receiver in downlink A BS (base station) (eNB: e-Node B) can operate as a receiver in uplink or a transmitter in downlink.

Namely, the UE/BS may include a Tx module 2140/2150 and a Rx module 2150/2170 to control transmission and reception of data and/or messages, and may further include an antenna 2100/2110 and the like to transmit and receive information, data and/or messages.

The UE/BS may include a processor 2120/2130 for performing embodiments of the present invention mentioned in the foregoing description and a memory 2180/2190 for storing a processing process of the processor temporarily or consistently.

The embodiments of the present invention can be performed using the components and functions of the UE and BS devices. For instance, the processor of the BS can perform a sync signal transmission and a pilot signal transmission required for mmWave ray scanning using the methods described in the above mentioned first to third paragraphs. The user equipment performs the mmWave ray scanning and is able to detect a resolvable ray through the repetitive AoA measurement. Details can refer to contents of the first to third paragraphs.

The Tx and Rx modules included in the UE/BS can perform a packet modulation/demodulation function for data transmission, a fast packet channel coding function, OFDMA (orthogonal frequency division multiple access) packet scheduling, TDD (Time Division Duplex) packet scheduling and/or a channel multiplexing function. Moreover, the UE/BS of FIG. 21 may further include a low power RF/IF (Radio Frequency/Intermediate Frequency) module.

Meanwhile, in the present invention, a user equipment may use a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, a hand-held PC, a notebook PC, a smart phone, a MM-MB (Multi Mode-Multi Band) terminal or the like.

Herein, the smart phone is a user equipment having the mixed benefits of a mobile communication terminal and a PDA, and may mean a terminal in which PDA's data communication functions such as schedule management, fax transmission/reception, internet access and the like are integrated are integrated with the mobile terminal. Moreover, the MM-MB terminal means a terminal operational in a mobile internet system and other mobile communication systems (e.g., CDMA (Code Division Multiple Access) 2000 system, WCDMA (Wideband CDMA) system, etc.) by having a multi-modem chip built inside.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in the memory unit 2180/2190 and is then drivable by the processor 2120/2130. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present are applicable to various wireless access systems. Examples of the various wireless access systems include 3GPP (3rd Generation Partnership Project) system, 3GPP2 system and/or IEEE 802.xx (Institute of Electrical and Electronic Engineers 802) system and the like. The embodiments of the present are applicable to all technical fields having the various wireless access systems applied thereto as well as to the various wireless access systems.

What is claimed is:

1. A method of performing a ray scanning by a user equipment in a wireless access system supporting a millimeter wave technology, comprising:

receiving a synchronization signal to match synchronization with a base station;

matching the synchronization with the base station using the synchronization signal;

receiving a pilot signal having a different configuration pattern per transmitting antenna port from the base station; and performing the ray scanning using the pilot signal,
wherein the ray scanning is different from a beam scanning for finding a beam for the user equipment from among multiple beams, and
wherein the ray scanning is for acquiring power spectrum for each direction surrounding the user equipment.

2. The method of claim 1, wherein the pilot signal is repeatedly transmitted a predetermined number of times.

3. The method of claim 1, wherein the pilot signal is transmitted from all transmitting antenna ports of the base station within an index duration and wherein the pilot signal is transmitted with a predetermined period.

4. The method of claim 1, wherein the pilot signal is transmitted through a single transmitting antenna port and wherein while the pilot signal is transmitted from the single transmitting antenna port, the pilot signal is not transmitted from the rest of the transmitting antenna ports of the base station.

5. The method of claim 1, further comprising obtaining a temporary cell identifier of a cell supported by the base station using the synchronization signal, wherein the user equipment performs a cell-specific ray scanning using the temporary cell identifier.

6. A user equipment performing a ray scanning in a wireless access system supportive of a millimeter wave technology, comprising:
a receiving module; and
a processor configured to support the ray scanning,
wherein the processor is further configured to:
receive a synchronization signal to match synchronization with a base station through the receiving module,
match the synchronization with the base station using the synchronization signal,
receive a pilot signal having a different configuration pattern per transmitting antenna port from the base station, and
perform the ray scanning using the pilot signal,
wherein the ray scanning is different from a beam scanning for finding a beam for the user equipment from among multiple beams, and
wherein the ray scanning is for acquiring power spectrum for each direction surrounding the user equipment.

7. The user equipment of claim 6, wherein the pilot signal is repeatedly transmitted a predetermined number of times.

8. The user equipment of claim 6, wherein the pilot signal is transmitted from all transmitting antenna ports of the base station within an index duration and wherein the pilot signal is transmitted with a predetermined period.

9. The user equipment of claim 6, wherein the pilot signal is transmitted through a single transmitting antenna port and wherein while the pilot signal is transmitted from the single transmitting antenna port, the pilot signal is not transmitted from the rest of the transmitting antenna ports of the base station.

10. The user equipment of claim 6, wherein the processor is further configured to obtain a temporary cell identifier of a cell supported by the base station using the synchronization signal and wherein the user equipment performs a cell-specific ray scanning using the temporary cell identifier.

* * * * *